US007837886B2

(12) United States Patent
Chung et al.

(10) Patent No.: US 7,837,886 B2
(45) Date of Patent: Nov. 23, 2010

(54) HEATING ELEMENT

(75) Inventors: Bradley D. Chung, Corvallis, OR (US); Bhavin Shah, Corvallis, OR (US); Anthony M. Fuller, Corvallis, OR (US); Ozgur Yildirim, Corvallis, OR (US); Garrett E. Clark, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 719 days.

(21) Appl. No.: 11/829,077

(22) Filed: Jul. 26, 2007

(65) Prior Publication Data

US 2009/0025634 A1 Jan. 29, 2009

(51) Int. Cl.
*B41J 2/04* (2006.01)
*G11B 5/127* (2006.01)

(52) U.S. Cl. ............................ 216/27; 216/41; 216/58; 347/55

(58) Field of Classification Search .................. 216/27, 216/41, 58; 347/55
See application file for complete search history.

(56) References Cited

U.S. PATENT DOCUMENTS

| | | | |
|---|---|---|---|
| 4,694,306 | A | 9/1987 | Ikeda et al. |
| 4,716,423 | A | 12/1987 | Chan et al. |
| 4,809,428 | A | 3/1989 | Aden et al. |
| 4,866,460 | A | 9/1989 | Shiozaki |
| 5,275,695 | A | 1/1994 | Chang et al. |
| 5,376,231 | A | 12/1994 | Matsumoto et al. |
| 5,450,108 | A | 9/1995 | Drake et al. |
| 5,870,121 | A | 2/1999 | Chan |
| 5,883,650 | A | 3/1999 | Figueredo et al. |
| 5,942,900 | A | 8/1999 | DeMeerleer et al. |
| 6,188,414 | B1 | 2/2001 | Wong et al. |
| 6,331,049 | B1 | 12/2001 | Leban |
| 6,347,861 | B1 | 2/2002 | Tom et al. |
| 6,352,338 | B1 | 3/2002 | Komuro |
| 6,443,564 | B1 | 9/2002 | Keil et al. |
| 6,481,831 | B1 | 11/2002 | Davis et al. |
| 6,513,913 | B2 | 2/2003 | Schulte et al. |
| 6,558,969 | B2 | 5/2003 | Miller et al. |
| 6,704,996 | B2 | 3/2004 | Mrvos et al. |
| 6,719,406 | B1 | 4/2004 | Silverbrook et al. |
| 6,767,474 | B2 | 7/2004 | Trueba et al. |
| 6,785,956 | B2 | 9/2004 | Xu et al. |
| 6,787,049 | B2 | 9/2004 | Tom et al. |
| 6,838,351 | B2 | 1/2005 | Sasaki et al. |
| 7,168,157 | B2 | 1/2007 | Miller et al. |

(Continued)

FOREIGN PATENT DOCUMENTS

| | | |
|---|---|---|
| JP | 02-214671 | 8/1990 |

(Continued)

OTHER PUBLICATIONS

International Search Report for Application No. PCT/US2008/071149. Report issued Jan. 20, 2009.

*Primary Examiner*—Shamim Ahmed

(57) ABSTRACT

A method of making a printhead comprises forming a resistor strip in a heating region of the printhead. In a first portion of the heating region, a resistive layer is formed including a central resistor region interposed between two spaced apart conductive elements. In the method, a conductive layer is removed from a bus region of the printhead while protecting the first portion of the heating region.

13 Claims, 15 Drawing Sheets

U.S. PATENT DOCUMENTS

| | | | | |
|---|---|---|---|---|
| 7,198,358 | B2 | 4/2007 | Sun et al. | |
| 2002/0158945 | A1 | 10/2002 | Miller et al. | |
| 2002/0158946 | A1 | 10/2002 | Schulte et al. | |
| 2003/0206216 | A1 | 11/2003 | Miller et al. | |
| 2004/0119789 | A1 * | 6/2004 | Usami et al. | 347/63 |
| 2006/0236537 | A1 * | 10/2006 | Chen et al. | 29/890.01 |
| 2007/0087484 | A1 | 4/2007 | Miller et al. | |

FOREIGN PATENT DOCUMENTS

| | | |
|---|---|---|
| JP | 07-171984 | 7/1995 |

* cited by examiner

HEATING ELEMENT

BACKGROUND

Ink cartridges include a printhead integrated within the cartridge or alternatively comprise an ink supply separate from a printhead. Accordingly, in this latter example, a consumer typically replaces the ink supply and re-uses the printhead.

However, in some instances, a printhead integrated within an ink cartridge fails prior to the ink supply being exhausted, forcing the consumer to replace the partially used ink cartridge. In other situations, commercial printers using industrial-type printheads may have to shut down their production when a printhead fails. This shutdown causes lost income from suspended production as well as increased maintenance cost for professional replacement of the failed printhead. In either case, a significant disruption occurs.

DETAILED DESCRIPTION

In the following detailed description, reference is made to the accompanying drawings which form a part hereof, and in which is shown by way of illustration specific embodiments in which the present disclosure may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

Embodiments of the present disclosure are directed to a heating region of a fluid ejection device, such as an inkjet printhead, as well as a method of forming the heating region. In one embodiment, a central resistor pad of the heating region is formed with a low profile sidewall and/or a low profile end portion to insure that upper layers (e.g., a passivation layer and cavitation barrier layer) overlying the central resistor pad form a substantially lower profile topography than conventional topographies of a resistor portion of a printhead. This low profile topography of the central resistor pad, in turn, promotes a more homogeneous formation of the respective upper layers (e.g., passivation and/or cavitation barrier) to exhibit greater strength and integrity for resisting penetration by corrosive inks or for resisting cavitation damage, thereby increasing the longevity of the central resistor pad and the printhead. In one embodiment, the method of forming the heating region includes forming the conductive elements (surrounding the end portions of the central resistor pad) of the heating region so that relatively steeper or thicker portions of the conductive elements are located externally of the sidewall of a fluid chamber of the heating region. This arrangement facilitates positioning the low profile topography of central resistor pad, and therefore the low profile topography of the upper layers, within the fluid chamber.

In another embodiment, the method of forming the heating region includes forming the non-conductive side areas (surrounding the central resistor pad) of the heating region so that a sidewall of the central resistor pad has a relatively small height or thickness relative to the non-conductive side areas. This arrangement also facilitates formation of a low profile topography of the upper layers of the heating region within the fluid chamber.

These embodiments, and additional embodiments, are described in more detail in association with FIGS. 1-34.

Figure 1:
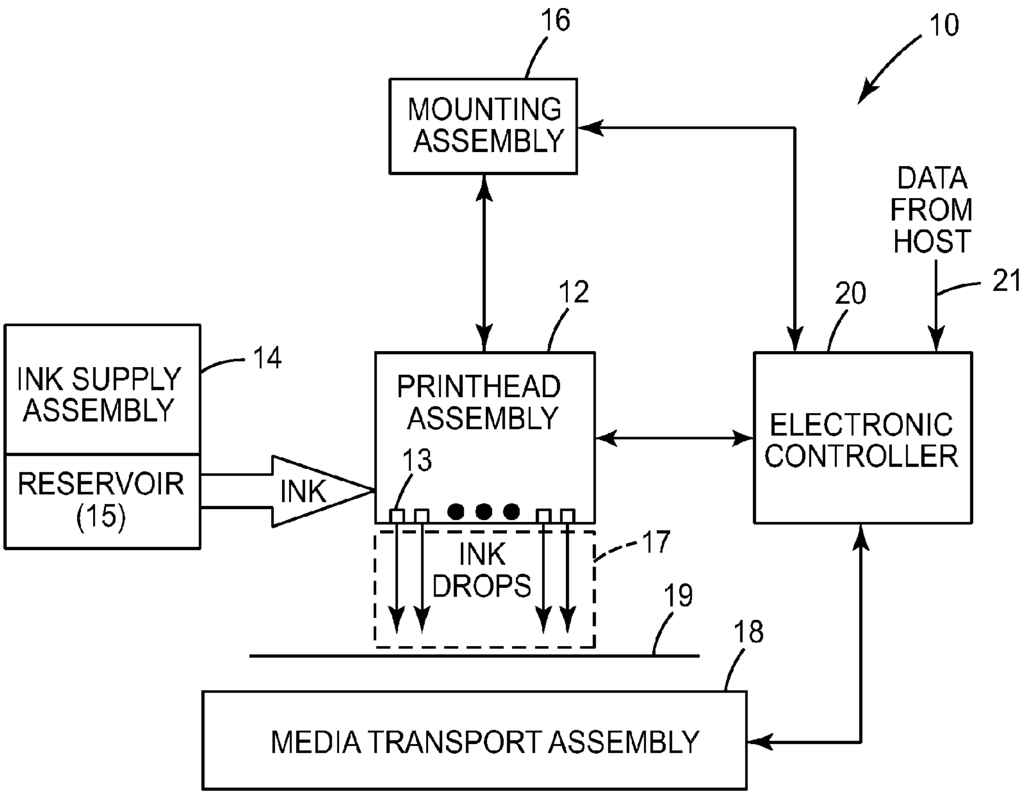
FIG. 1 is a block diagram illustrating an inkjet printing system, according to one embodiment of the present disclosure.

FIG. 1 illustrates an inkjet printing system 10, according to one embodiment of the present disclosure. Inkjet printing system 10 comprises one embodiment of a fluid ejection system which includes a fluid ejection assembly, such as an inkjet printhead assembly 12, and a fluid supply assembly, such as an ink supply assembly 14. In the illustrated embodiment, inkjet printing system 10 also includes a mounting assembly 16, a media transport assembly 18, and an electronic controller 20. Inkjet printhead assembly 12, as one embodiment of a fluid ejection assembly, is formed according to an embodiment of the present disclosure, and includes one or more printheads or fluid ejection devices which eject drops of ink or fluid through a plurality of orifices or nozzles 13. In one embodiment, the drops are directed toward a medium, such as print medium 19, so as to print onto print medium 19. Print medium 19 is any type of suitable sheet material, such as paper, card stock, transparencies, Mylar, and the like. Typically, nozzles 13 are arranged in one or more columns or arrays such that properly sequenced ejection of ink from nozzles 13 causes, in one embodiment, characters, symbols, and/or other graphics or images to be printed upon print medium 19 as inkjet printhead assembly 12 and print medium 19 are moved relative to each other.

Ink supply assembly 14, as one embodiment of a fluid supply assembly, supplies ink to printhead assembly 12 and includes a reservoir 15 for storing ink. As such, in one embodiment, ink flows from reservoir 15 to inkjet printhead assembly 12. In this embodiment, ink supply assembly 14 and inkjet printhead assembly 12 can form either a one-way ink delivery system or a recirculating ink delivery system. In a one-way ink delivery system, substantially all of the ink supplied to inkjet printhead assembly 12 is consumed during printing. In a recirculating ink delivery system, however, a portion of the ink supplied to printhead assembly 12 is consumed during printing. As such, a portion of the ink not consumed during printing is returned to ink supply assembly 14.

In one embodiment, inkjet printhead assembly 12 and ink supply assembly 14 are housed together in an inkjet or fluidjet cartridge or pen. In another embodiment, ink supply assembly 14 is separate from inkjet printhead assembly 12 and supplies ink to inkjet printhead assembly 12 through an interface connection, such as a supply tube (not shown). In either embodiment, reservoir 15 of ink supply assembly 14 may be removed, replaced, and/or refilled. In one embodiment, where inkjet printhead assembly 12 and ink supply assembly 14 are housed together in an inkjet cartridge, reservoir 15 includes a local reservoir located within the cartridge and/or a larger reservoir located separately from the cartridge. As such, the separate, larger reservoir serves to refill the local reservoir. Accordingly, the separate, larger reservoir and/or the local reservoir may be removed, replaced, and/or refilled.

Mounting assembly 16 positions inkjet printhead assembly 12 relative to media transport assembly 18 and media transport assembly 18 positions print medium 19 relative to inkjet printhead assembly 12. Thus, a print zone 17 is defined adjacent to nozzles 13 in an area between inkjet printhead assembly 12 and print medium 19. In one embodiment, inkjet printhead assembly 12 is a scanning type printhead assembly. As such, mounting assembly 16 includes a carriage for moving inkjet printhead assembly 12 relative to media transport assembly 18 to scan print medium 19. In another embodiment, inkjet printhead assembly 12 is a non-scanning type printhead assembly. As such, mounting assembly 16 fixes inkjet printhead assembly 12 at a prescribed position relative to media transport assembly 18. Thus, media transport assembly 18 positions print medium 19 relative to inkjet printhead assembly 12.

Electronic controller 20 communicates with inkjet printhead assembly 12, mounting assembly 16, and media transport assembly 18. Electronic controller 20 receives data 21 from a host system, such as a computer, and includes memory for temporarily storing data 21. Typically, data 21 is sent to inkjet printing system 10 along an electronic, infrared, optical or other information transfer path. Data 21 represents, for example, a document and/or file to be printed. As such, data 21 forms a print job for inkjet printing system 10 and includes one or more print job commands and/or command parameters.

In one embodiment, electronic controller 20 provides control of inkjet printhead assembly 12 including timing control for ejection of ink drops from nozzles 13. As such, electronic controller 20 defines a pattern of ejected ink drops which form characters, symbols, and/or other graphics or images on print medium 19. Timing control and, therefore, the pattern of ejected ink drops, is determined by the print job commands and/or command parameters. In one embodiment, logic and drive circuitry forming a portion of electronic controller 20 is located on inkjet printhead assembly 12. In another embodiment, logic and drive circuitry is located off inkjet printhead assembly 12.

Figure 2:
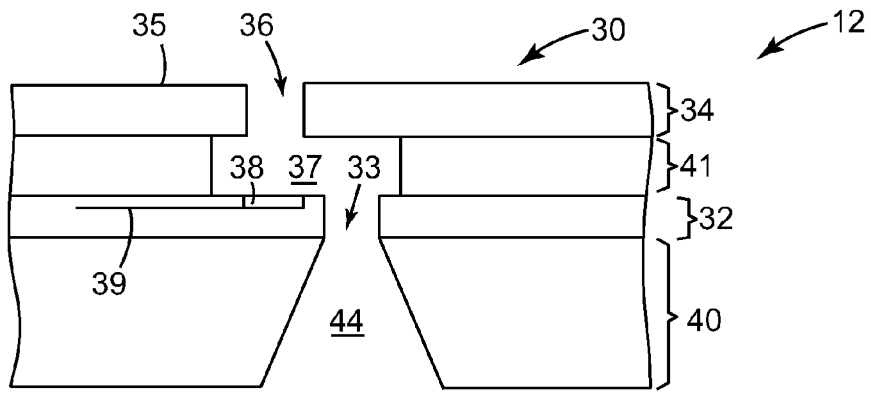
FIG. 2 is a schematic cross-sectional view illustrating a portion of a fluid ejection device, according to one embodiment of the present disclosure.

FIG. 2 illustrates one embodiment of a portion of inkjet printhead assembly 12. Inkjet printhead assembly 12, as one embodiment of a fluid ejection assembly, includes an array of drop ejecting elements 30. Drop ejecting elements 30 are formed on a substrate 40 which has a fluid (or ink) feed slot 44 formed therein. As such, fluid feed slot 44 provides a supply of fluid (or ink) to drop ejecting elements 30.

In one embodiment, each drop ejecting element 30 includes a thin-film structure 32, an orifice layer 34, a chamber layer 41, and a firing resistor 38. Thin-film structure 32 has a fluid (or ink) feed channel 33 formed therein which communicates with fluid feed slot 44 of substrate 40. Orifice layer 34 has a front face 35 and a nozzle opening 36 formed in front face 35. Chamber layer 41 also has a fluid chamber 37 formed therein which communicates with nozzle opening 36 and fluid feed channel 33 of thin-film structure 32. Firing resistor 38 is positioned within fluid chamber 37 and includes leads 39 which electrically couple firing resistor 38 to a drive signal and ground.

In one embodiment, during operation, fluid flows from fluid feed slot 44 to fluid chamber 37 via fluid feed channel 33. Nozzle opening 36 is operatively associated with firing resistor 38 such that droplets of fluid are ejected from fluid chamber 37 through nozzle opening 36 (e.g., normal to the plane of firing resistor 38) and toward a medium upon energization of firing resistor 38.

Example embodiments of inkjet printhead assembly 12 include a thermal printhead, a piezoelectric printhead, a flextensional printhead, or any other type of fluid ejection device known in the art. In one embodiment, inkjet printhead assembly 12 is a fully integrated thermal inkjet printhead. As such, substrate 40 is formed, for example, of silicon, glass, or a stable polymer, and thin-film structure 32 is formed by one or more passivation or insulation layers of silicon dioxide, silicon carbide, silicon nitride, tantalum, poly-silicon glass, or other suitable material. Thin-film structure 32 also includes a conductive layer which defines firing resistor 38 and leads 39. The conductive layer is formed, for example, by aluminum, gold, tantalum, tantalum-aluminum, or other metal or metal alloy.

Figure 14:
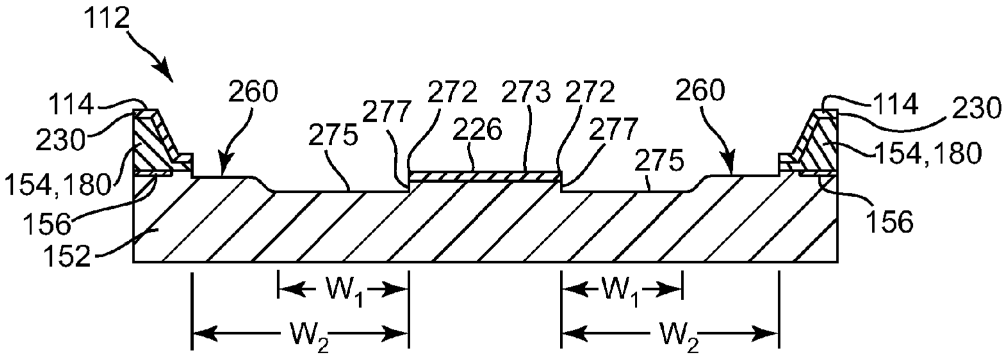
FIG. 14 is a sectional view as taken along lines 14-14 of FIG. 12 and illustrates a method of forming a heating region of a fluid ejection device, according to one embodiment of the present disclosure.
Figure 15:
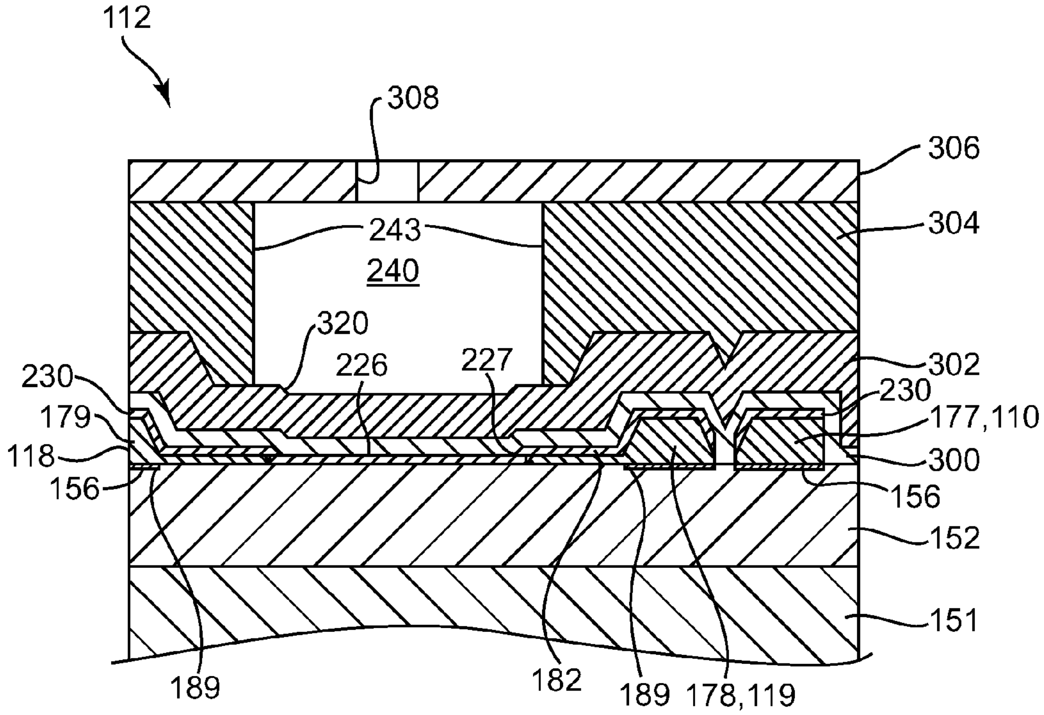
FIG. 15 is a sectional view generally corresponding to the sectional view of FIG. 13 and illustrates a method of forming a heating region of a fluid ejection device, according to one embodiment of the present disclosure.
Figure 16:
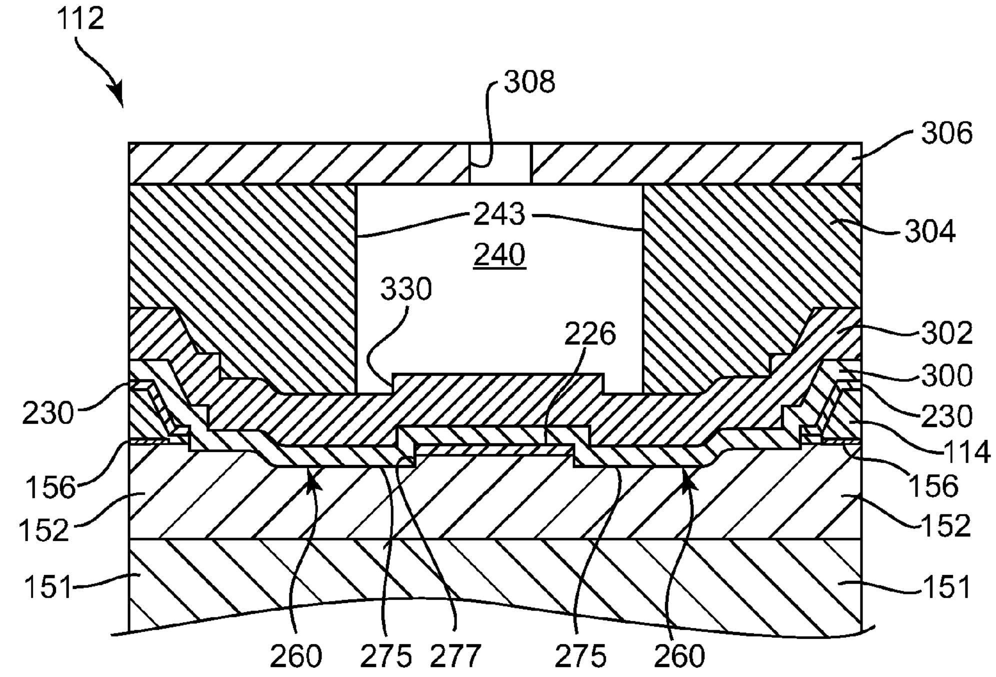
FIG. 16 is a sectional view generally corresponding to the sectional view of FIG. 14 and illustrates a method of forming a heating region of a fluid ejection device, according to one embodiment of the present disclosure.

FIGS. 3-16 illustrate a method of making a heating region of a fluid ejection device, according to one embodiment of the present disclosure, with FIGS. 15-16 illustrating the heating region formed by the method. In one embodiment, the heating region of the fluid ejection device comprises substantially the same features and attributes as the fluid ejection device and/or printhead assembly described and illustrated in FIGS. 1-2.

Figure 3:
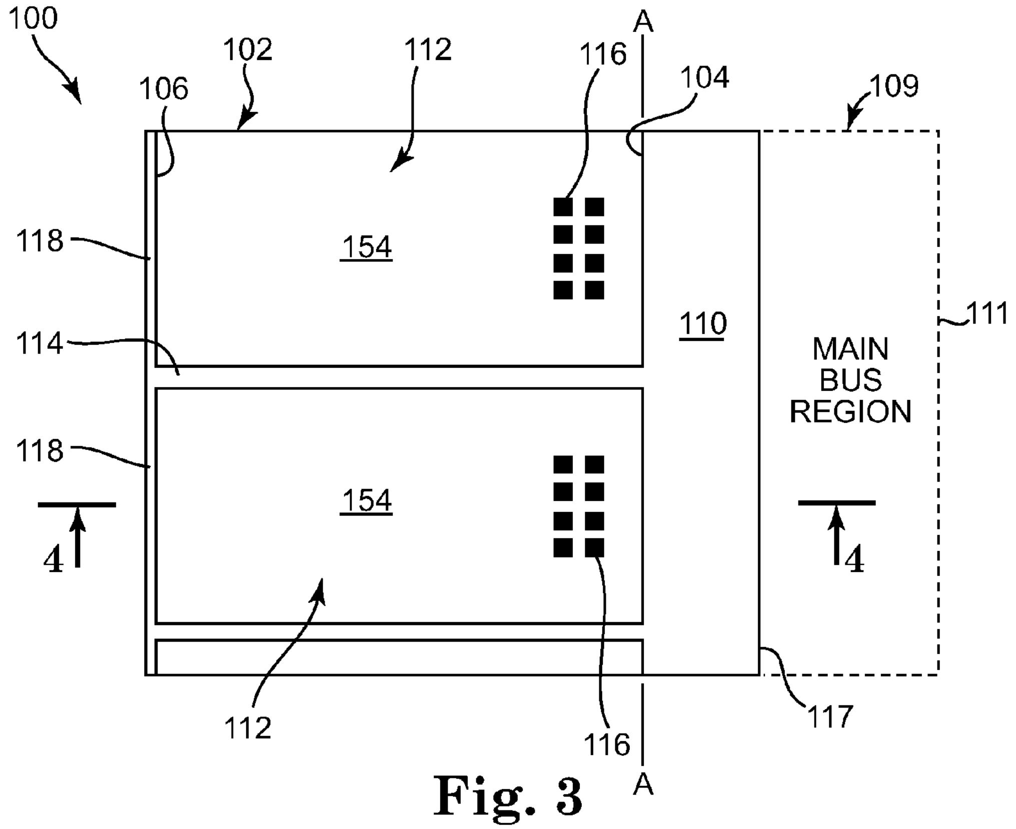
FIG. 3 is a top view of a partially formed heating region of a fluid ejection device, according to one embodiment of the present disclosure.

FIG. 3 is a top view illustrating a partially formed heating region 102 of a printhead assembly 100. The heating region 102 is positioned adjacent to and receives power from a power bus 109 of the printhead assembly 100 with power bus 109 including main bus region (as represented by dashed lines 111) and transition portion 110. As illustrated in FIG. 3, line A schematically represents the boundary between the heating region 102 and transition portion 110 of power bus 109 while reference 117 indicates the boundary between the main bus region 110 and transition portion 110. In one embodiment, transition portion 110 of power bus 109 generally separates heating region 102 from main bus region 111, which includes additional components and/or circuitry not present in transition portion 110. In addition, power bus 109 includes extension portions 114 and 118 that extend from transition portion 110 into heating region 102 to further define the boundaries each heating element 112 of the plurality of heating elements 112 of heating region 102. In one embodiment, the respective portions 111, 110, 114, and 118 of power bus 109 generally correspond to "conductive traces" of printhead assembly 100 and act together to feed multiple heating elements 112.

As illustrated in FIG. 3, extension portions 114 separate a plurality of heating elements 112 of the heating region 102 from each other with each heating element 112 including a first end 104 and a second end 106. In another aspect, as illustrated in FIG. 3, upon their complete formation, transition portion 110 and extension portions 114, 118 of power bus 109 act as physical boundaries and provide electrical functions to enable operation of the respective heating elements 112 of heating region 102. As illustrated in FIG. 3, each heating element 112 of partially formed heating region 102 comprises a first conductive layer 154 and an array 116 of via pads (later identified as via pad 119).

Figure 4:
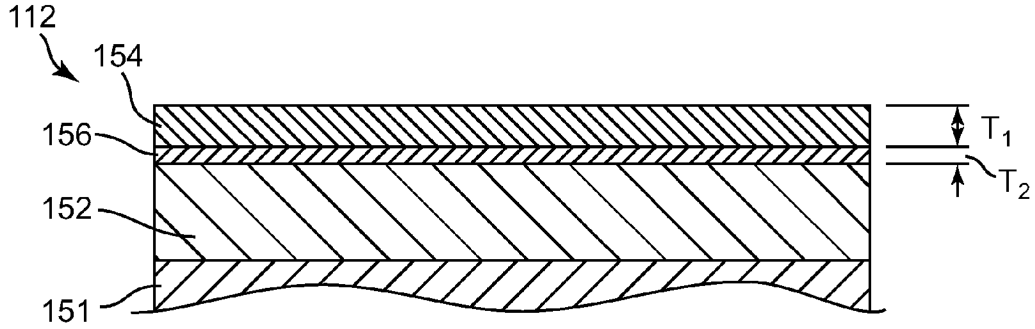
FIG. 4 is a sectional view as taken along lines 4-4 of FIG. 3 and illustrates a method of forming a heating region of a fluid ejection device, according to one embodiment of the present disclosure.

FIG. 4 is a sectional view of one heating element 112 of partially formed heating region 102 as taken along lines 4-4 of FIG. 3, according to one embodiment of the present disclosure. FIG. 4 illustrates a first conductive layer 154 formed on top of an insulation layer 152 and supporting substrate 151. In one embodiment, a neutralizing layer 156 is interposed between the first conductive layer 154 and insulation layer 152 with the neutralizing layer 156 acting to minimize junction spiking and electromigration.

In one embodiment, the first conductive layer 154 is an aluminum material while in other embodiments, the first conductive layer 154 comprises aluminum, copper, or gold, as well as combinations of these conductive materials. The first conductive layer 154 is deposited using known techniques including, but not limited to, sputtering and evaporation. In one embodiment, substrate 151 comprises a silicon wafer, a glass material, a semiconductor material, or other known materials suitable for use as a substrate for a fluid ejection device.

In one embodiment, the insulation layer 152 is grown or deposited over the substrate 151 to provide a fluid barrier over substrate 151 as well as providing electrical and/or thermal protection of substrate 151. In one embodiment, the insulation layer 152 comprises a silicon dioxide layer formed by chemical vapor deposition of a tetraethyl orthosilicate (TEOS) material. In other embodiments, insulation layer 152 comprises a material formed of aluminum oxide, silicon carbide, silicon nitride, or glass. In one embodiment, insulation layer 152 is formed via thermal growth, sputtering, evaporation, or chemical vapor deposition. In one embodiment, insulation layer 152 comprises a thickness of about 1 or 2 microns.

In one embodiment, the neutralizing layer 156 is deposited over the insulation layer 152 and comprises a titanium plus titanium nitride material. In other embodiments, the neutralizing layer 156 comprises a material formed of titanium tungsten, titanium, titanium alloy, metal nitride, tantalum aluminum, or aluminum silicone.

As illustrated in FIG. 4, first conductive layer 154 comprises a thickness (T1) substantially greater than a thickness (T2) of the neutralizing layer 156. Examples of the thicknesses of the various layers of heating element 112 are described in more detail in association with FIGS. 5-9.

Figure 5:
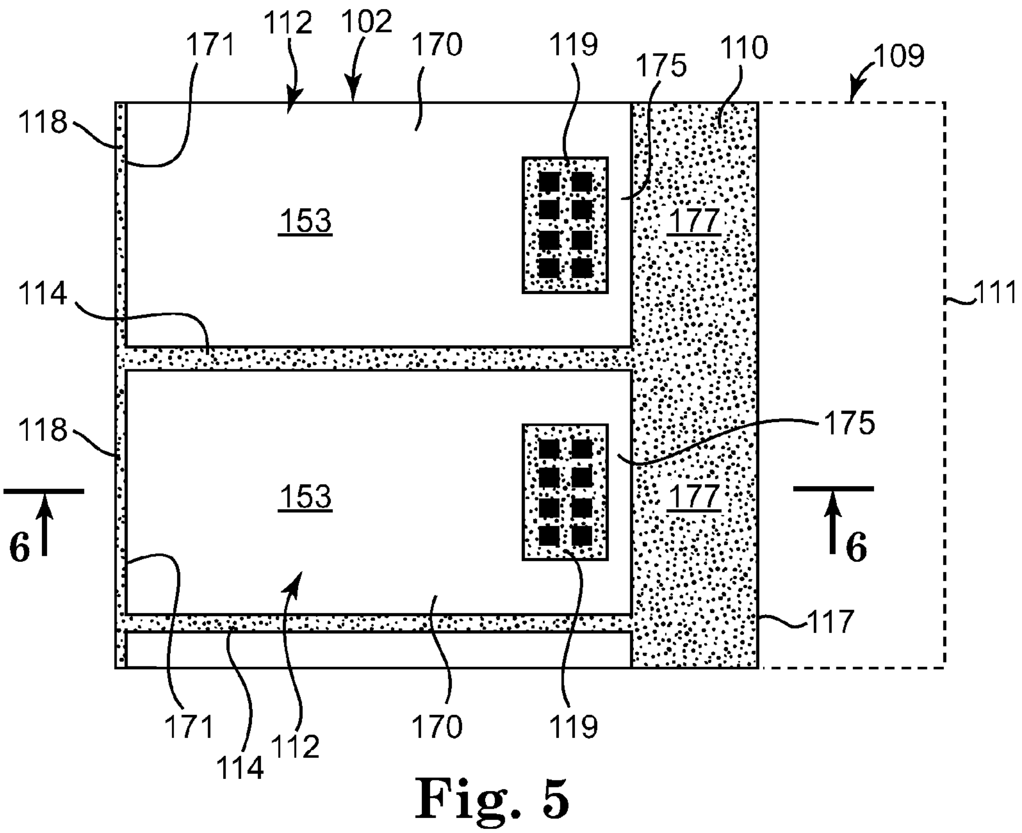
FIG. 5 is a top view of a partially formed heating region of a fluid ejection device, according to one embodiment of the present disclosure.
Figure 6:
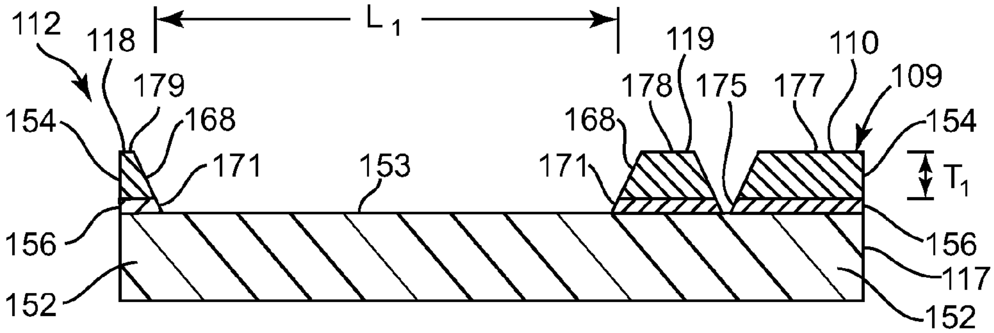
FIG. 6 is a sectional view as taken along lines 6-6 of FIG. 5 and illustrates a method of forming a heating region of a fluid ejection device, according to one embodiment of the present disclosure.

FIG. 5 is a top view of a partially formed heating region 102 and FIG. 6 is a sectional view of one heating element 112 of the partially formed heating region 102, according to one embodiment of the present disclosure. FIGS. 5 and 6 illustrate formation of a first window 171 within first conductive layer 154 with first window defining a length (L1). As illustrated in FIG. 5, transition portion 110 and extension portions 114, 118 of power bus 109, and via pad 119 are protected via masking (as represented by shading) while areas 170 and 175 are etched to define first window 171 and to define slot 175 within first conductive layer 154, as illustrated in FIG. 6. After etching, the masked portions 110, 118 of power bus 109, and via pad 119 shown in FIG. 5, correspond to and define conductive elements 177, 179, 178, respectively, on top of insulation layer 152, as illustrated in FIG. 6. In addition, in one embodiment, removal of the first conductive layer 154 in areas 170 and 175 also includes removal of neutralizing layer 156 to expose a surface 153 of insulation layer 152 within first window 171 and within slot 175. In another aspect, the neutralizing layer 156 remains underneath the remaining conductive elements 177, 178, and 179.

In one embodiment, respective conductive elements 178, 179 are spaced apart from each other on opposite ends of the first window 171 with each respective conductive element 178, 179 including a beveled surface 168 so that the beveled surfaces 168 of the respective conductive elements 178, 179 face each other. In one aspect, each respective conductive element 178, 179 retains the thickness T1 of first conductive layer 154.

In one embodiment, etching of a conductive layer, such as first conductive layer 154, comprises dry etching. Likewise, in one embodiment, etching of other layers as described in association with FIG. 7 comprises dry etching.

Figure 7:
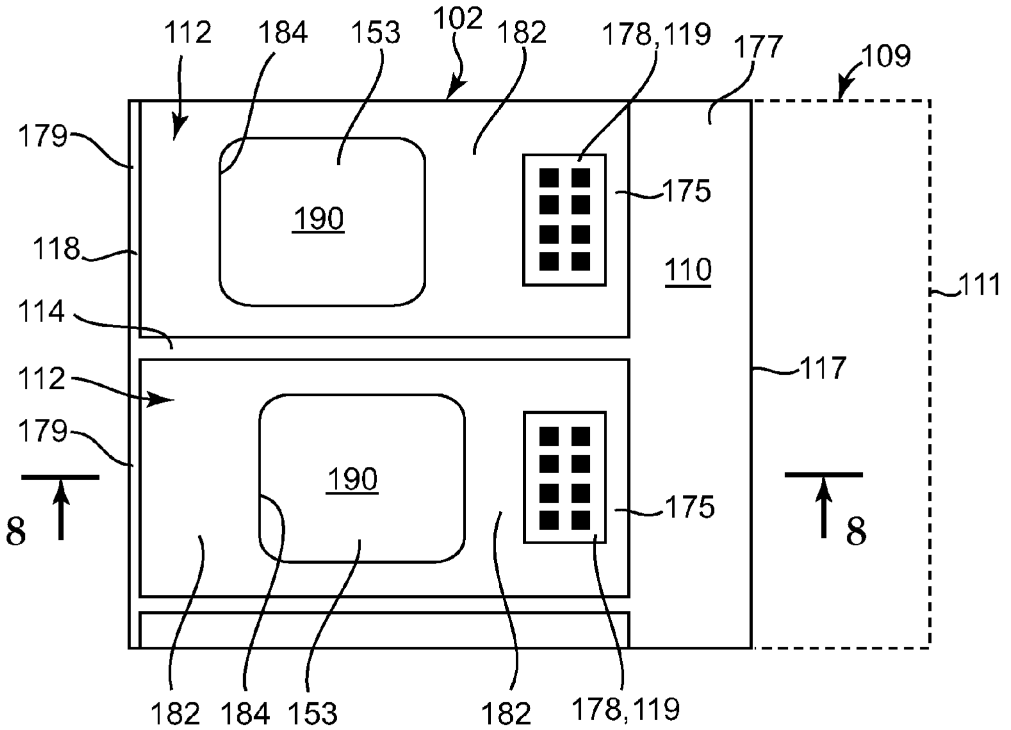
FIG. 7 is a top view of a partially formed heating region of a fluid ejection device, according to one embodiment of the present disclosure.
Figure 8:
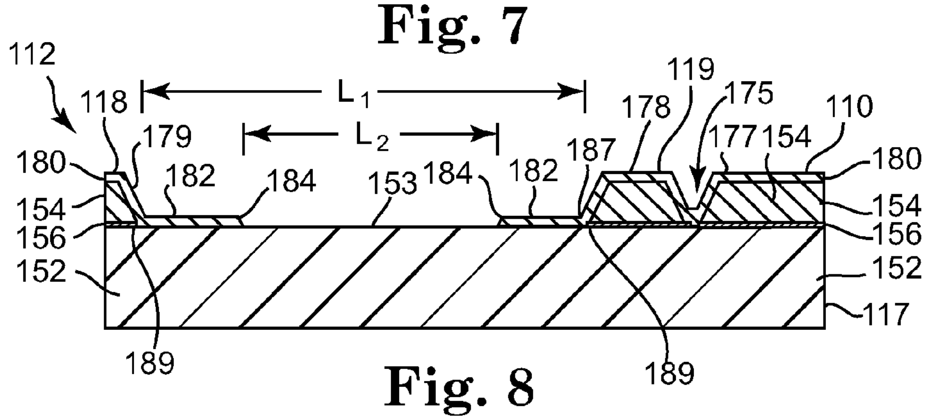
FIG. 8 is a sectional view as taken along lines 8-8 of FIG. 7 and illustrates a method of forming a heating region of a fluid ejection device, according to one embodiment of the present disclosure.
Figure 9:
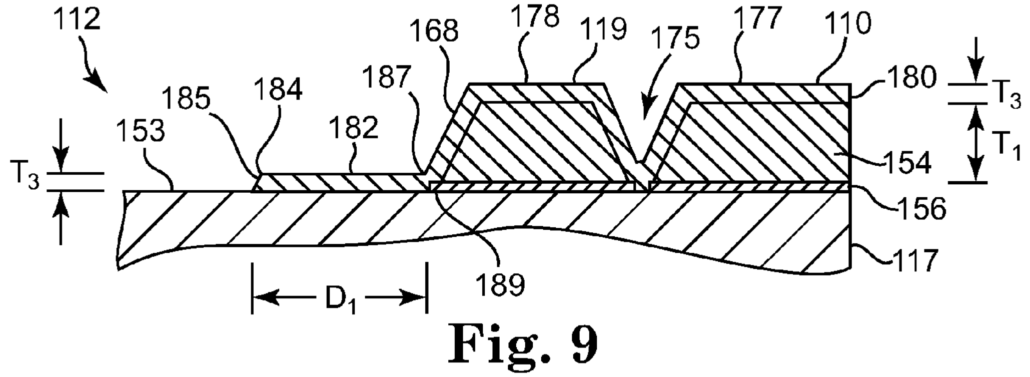
FIG. 9 is an enlarged partial sectional view of FIG. 8, according to one embodiment of the present disclosure.

FIG. 7 is a top view of a partially formed heating region 102 and FIG. 8 is a sectional view of one heating element 112 of the partially formed heating region 102, according to one embodiment of the present disclosure. FIG. 9 is an enlarged partial sectional view further illustrating the embodiment of FIG. 8. As illustrated in FIGS. 7-8, a second conductive layer 180 is deposited over the entire respective heating elements 112 of heating region 102 and then area 190 is etched in the newly formed second conductive layer 180 (without etching other areas in the second conductive layer) to define second window 184, thereby exposing surface 153 of insulation layer 152. With the addition of the second conductive layer 180 and formation of second window 184, each respective conductive element 177, 178, 179 defines a thicker conductive component while slot 175 is partially filled in by second conductive layer 180. Accordingly, in one aspect, the first conductive layer 154 and second conductive layer 180 effectively form the slightly thicker respective conductive elements 177, 178, 179.

In one embodiment, upon forming second window 184 in the second conductive layer 180, a conductive shelf 182 is formed. In one aspect, as illustrated in FIGS. 8-9, the conductive shelf 182 comprises an inner portion 185 and an outer portion 187. The outer portion 187 is in contact with, and extends inwardly from, respective conductive elements 178, 179 while the inner portion 185 (i.e., inner edge) of the conductive shelf 182 defines second window 184. In another aspect, the inner portion 185 of conductive shelf 182 also defines a length (L2) of a central resistor pad 226 within second window 184, which is more fully illustrated and described later in association with FIGS. 10-11. In one aspect, the length (L1) of first window 171 is greater than the length (L2) of second window 184.

In addition, as illustrated in FIGS. 8-9, in one embodiment the formation of the second conductive layer 180 within first window 171 over insulation layer 152 results in the absence (i.e., omission) of neutralizing layer 156 underneath conductive shelf 182. However, as previously illustrated in FIGS. 5-6, neutralizing layer 156 still extends underneath the respective conductive elements 177, 178, and 179. In another aspect, as illustrated in FIG. 9, neutralizing layer 156 includes an edge 189 that is spaced apart from inner portion 185 of conductive shelf 182 by a distance (D1) to be located remotely or externally relative to second window 184.

In one embodiment, as illustrated in FIGS. 8-9, conductive shelf 182 defines a generally planar member that forms a generally terraced pattern relative to the respective conductive elements 178, 179 and relative to the surface 153 of insulation layer 152.

In one embodiment, as illustrated in FIGS. 8-9, conductive shelf 182 has a thickness generally corresponding to a thickness (T3) of the second conductive layer 180. In one embodiment, the thickness (T1) of each respective conductive element 177, 178, 179 is substantially greater than a thickness of the conductive shelf 182 (both before and after addition of the second conductive layer 180). In one embodiment, the first conductive layer 154 has a thickness (T1) of about 4000 Angstroms and the second conductive layer 180 has a thickness (T3) of about 1000 Angstroms. Accordingly, in this embodiment, after formation of the second conductive layer 180, conductive elements 177, 178, 179 have a total thickness of about 5000 Angstroms while conductive shelf 182 has a total thickness of about 1000 Angstroms.

In another embodiment, the first conductive layer 154 has a thickness (T1) of about 3000 Angstroms and the second conductive layer 180 has a thickness (T3) of about 2000 Angstroms. Accordingly, in this embodiment, after formation of the second conductive layer 180, conductive elements 177, 178, 179 have a total thickness of about 5000 Angstroms while conductive shelf 182 has a total thickness of about 2000 Angstroms.

In one embodiment, inner portion 185 of conductive shelf 182 defines a first junction relative to exposed surface 153 of insulation layer 152 and outer portion 187 of conductive shelf 182 defines a second junction relative to beveled surface 168 (see also FIG. 6) of each respective conductive element 178, 179. In one aspect, the first junction forms a low profile topography (or a low profile transition) because the thickness (T3) of the conductive shelf 182 is relatively minimal relative to the exposed surface 153 of the insulation layer 152 while the second junction provides a generally steep or abrupt junction because the thickness (T1) of the respective conductive elements 178, 179 is substantially greater than the thickness (T3) of the conductive shelf 182.

Figure 10:
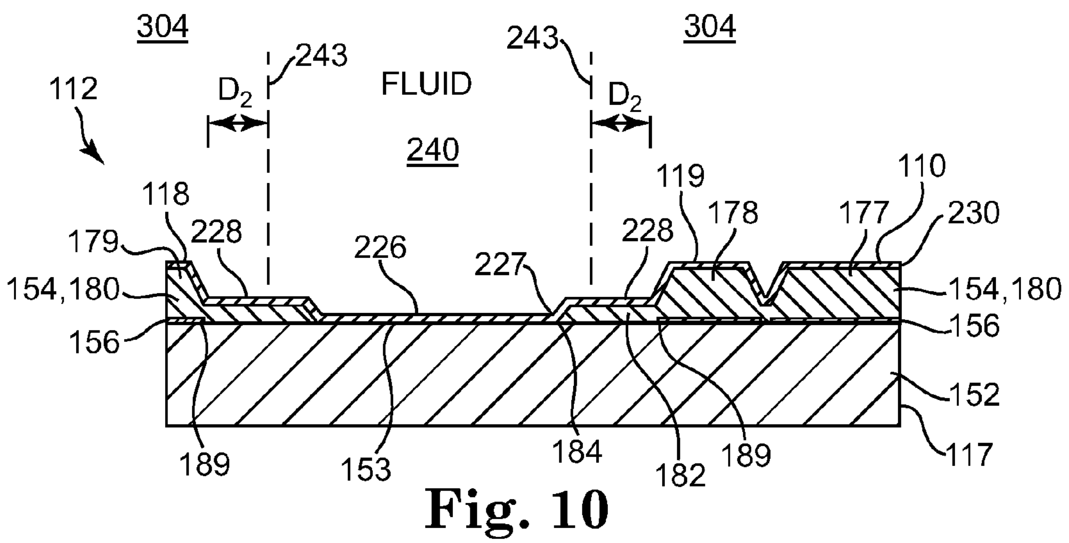
FIG. 10 is a sectional view illustrating a partially formed heating region of a fluid ejection device and a method of forming the heating region, according to one embodiment of the present disclosure.
Figure 11:
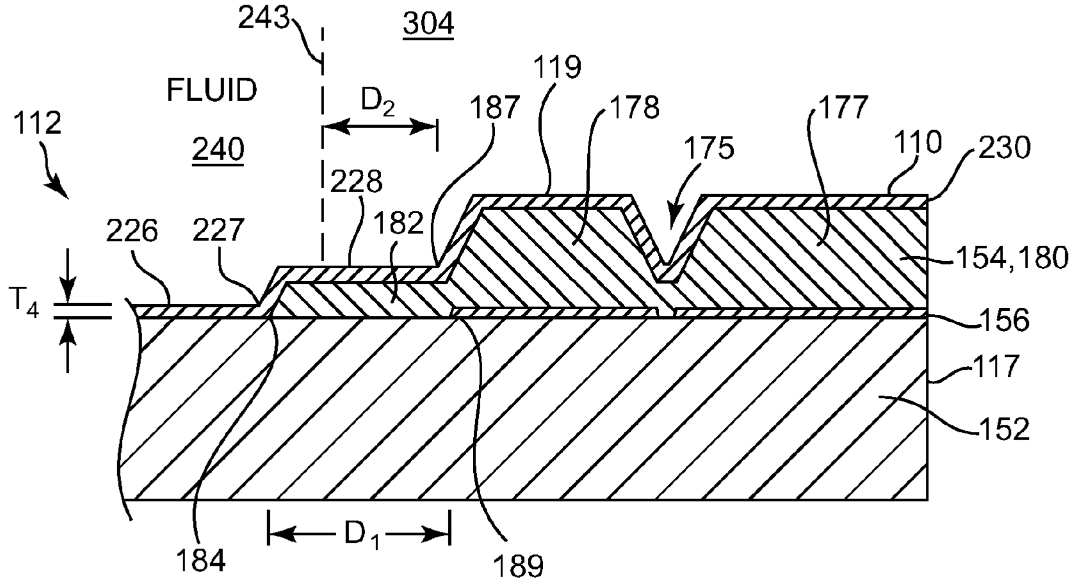
FIG. 11 is an enlarged partial sectional view of the embodiment of FIG. 10, according to one embodiment of the present disclosure.

FIG. 10 is a sectional view illustrating formation of a resistive layer 230 on each heating element 112 of the partially formed heating region 102, according to one embodiment of the present disclosure. FIG. 11 is an enlarged partial sectional view further illustrating the embodiment of FIG. 10.

As illustrated in FIG. 10, resistive layer 230 is deposited over substantially the entire heating element 112 to overlie the respective conductive elements 177, 178, 179, to overlie conductive shelf 182, and to overlie the exposed surface 153 of insulation layer 152 within second window 184. In one embodiment, the conductive elements 177, 178, 179, and conductive shelf 182 generally retain their respective shapes, except now further including the overlying resistive layer 230. The addition of the resistive layer 230 on top of conductive shelf 182 forms a generally planar member 228. In one embodiment, the material forming resistive layer 230 comprises tungsten silicon nitride while in other embodiments, the resistive material comprises tantalum aluminum, nickel chromium or titanium nitride.

In one embodiment, as illustrated in FIGS. 10-11, the portion of resistive layer 230 formed over the exposed surface 153 of insulation layer 152 within second window 184 defines a central resistor region 226 (i.e., resistor pad). In one aspect, the central resistor pad 226 includes an outer edge 227 that is spaced apart by a distance (D1) from edge 189 of neutralizing layer 156. In one embodiment, the resistive layer has a thickness (T4) of about 1000 Angstroms so that central resistor pad 226 has a thickness of about 1000 Angstroms.

In one aspect, later steps in forming the heating elements 112 of the heating region 102 result in formation of a fluid chamber 240 defined by sidewalls (represented by dashed lines 243) of a chamber layer 304 (see FIGS. 15-16). Accordingly, in one embodiment, a width of conductive shelf 182 (and consequently generally planar member 228) is selected so that each respective sidewall 243 of fluid chamber 240 is vertically aligned above conductive shelf 182 to position the outer portion 187 of conductive shelf 182 to be spaced apart from each respective sidewall 243 by a distance (D2). This positioning of sidewall 243 of fluid chamber 240 (relative to outer portion 187 of conductive shelf 182) isolates outer portion 187 of conductive shelf 182 externally of the fluid chamber 240. In one aspect, as illustrated in FIGS. 8-9, a width (D1) of the conductive shelf 182 isolates, away from fluid chamber 240, the more abrupt transition between the outer portion 187 of conductive shelf 182 and the beveled surface 168 of the respective conductive elements 178, 179.

Moreover, the low profile of generally planar member 228 (substantially defined by the generally planar conductive shelf 182) relative to central resistor pad 226 enables the later formed passivation layer and cavitation barrier layers to form smoother, low profile transitions over the outer edge 227 of the central resistor pad 226 at inner portion 185 (FIG. 9) of the conductive shelf 182. These low profile transitions, in turn, increase the integrity and strength of the passivation and cavitation layers because the formation of those layers occurs more homogenously that otherwise would occur at the conventional high profile transition (formed between a conventional resistor length and conventional steep or abrupt beveled conductive elements that border conventional resistor pads).

In another embodiment, this arrangement results in edge 189 of neutralizing layer 156 being spaced apart from sidewall 243 of fluid chamber 240 by the substantially the same distance (D2) which isolates (or externally locate) edge 189 of neutralizing layer 156 away from fluid chamber 240.

Accordingly, the low profile of conductive shelf 182 defining generally planar member 228 (and the isolation of conductive elements 178, 179 externally of the position of sidewalls 243 of fluid chamber 240) substantially increases the longevity of central resistor pad 226 by substantially preventing or reducing penetration of corrosive inks through the passivation and cavitation layers.

Figure 12:
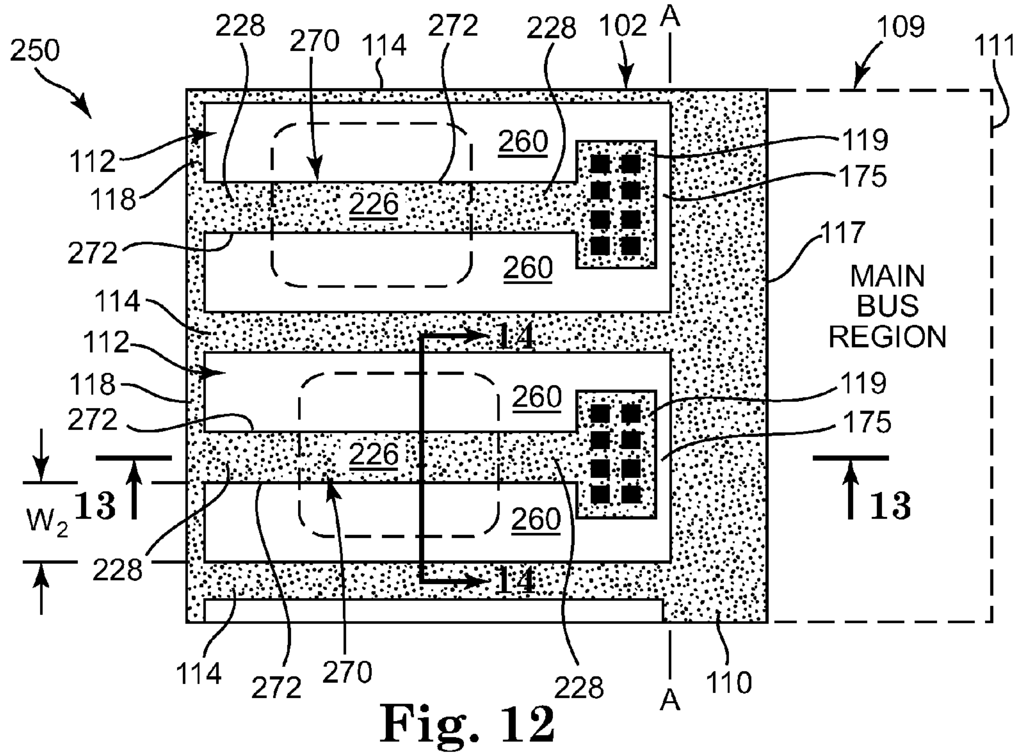
FIG. 12 is a top view of a partially formed heating region of a fluid ejection device and illustrating a method of forming the heating region, according to one embodiment of the present disclosure.
Figure 13:
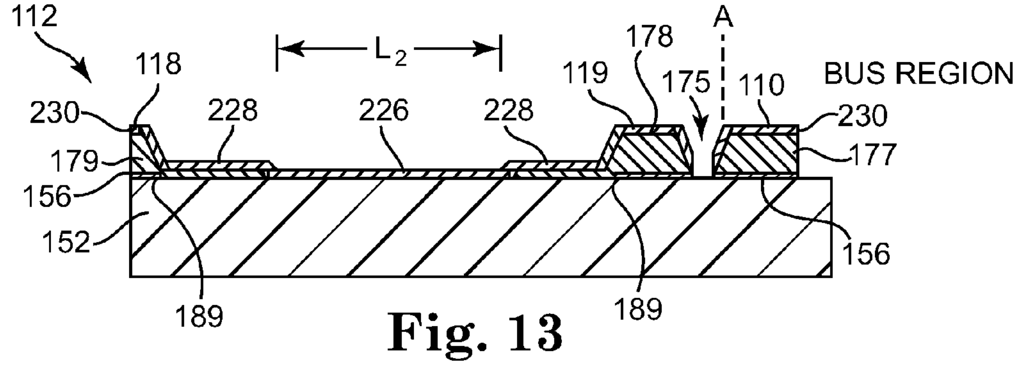
FIG. 13 is a sectional view as taken along lines 13-13 of FIG. 12 and illustrates a method of forming a heating region of a fluid ejection device, according to one embodiment of the present disclosure.

FIG. 12 is a top view of a partially formed heating region 102 and FIG. 13 is a sectional view, as taken along lines 13-13 of FIG. 12, of one heating element 112 of the partially formed heating region 102, according to one embodiment of the present disclosure. FIG. 13 illustrates the generally terraced arrangement of the generally planar member 228 (including conductive shelf 182) relative to conductive elements 178, 179 and relative to central resistor pad 226 of the heating region 102. FIG. 14 is a sectional view taken along lines 14-14 of FIG. 12 and illustrates a low profile sidewall 277 of central resistor pad 226 of heating element 112 of heating region 102.

FIGS. 12-14 illustrate one embodiment of a method of further formation of the heating region 102 of the embodiments of FIGS. 10-11. In one aspect, the method comprises preserving or protecting substantially the entire heating 102 region and transition portion 110 of power bus 109 (having the structure shown in FIG. 10) via masking over the resistive layer 230 (that covers the entire heating region 102 and transition portion 110 of power bus 109) while etching the main bus region 111 to remove at least a conductive layer and/or other layers. In one embodiment, this etching step is a "deep etching" step in which at least about 4000-5000 Angstroms of conductive material (and/or other material) is removed from the main bus region 111. At the same time, no material is removed from the heating region 102 and from transition portion 110 of power bus 109. Accordingly, upon etching of the main bus region 111 (without etching other areas of heating region 102), the structure of the heating region 102 as illustrated in FIG. 10 is generally unaffected.

Next, as illustrated in FIG. 12, while preserving the main bus region 111, the resistive-covered areas (including transition portion 110, extension portions 114, 118, via pad 119, resistor pad 226, and generally planar members 228) are masked to enable etching of side areas 260 remove both resistive layer 230 and second conductive layer 180 from the respective side areas 260 of each respective heating element 112. In one embodiment, resistive covered central resistor pad 226 and generally planar member 228 define a resistor strip 270 with side areas 260 extending laterally outward in opposite directions from side edges 272 of resistor strip 270. In one aspect, side areas 260 also surround masked via pad 119.

As illustrated in FIG. 14, etching the side areas 260 of heating region 102 separately from the etching of main bus region 111 facilitates removal from the side areas 260 of a relatively shallow depth of both the resistive layer 230 (e.g., about 1000 Angstroms) and the second conductive layer 180 (e.g., about 1000 Angstroms). As illustrated in FIG. 14, this "shallow etching" results in etched side area 260 including a generally planar shoulder portion 275 immediately adjacent side edges 272 of central resistor pad 226, as illustrated in FIG. 14. This arrangement produces a low profile sidewall 277 of central resistor pad 226 of resistor strip 270. In one embodiment, this low profile sidewall 277 has a thickness of about 2000 Angstroms, generally corresponding to the thickness of material removed in the shallow etching step represented by FIGS. 12 and 14.

Accordingly, in one embodiment, a top surface 273 of the central resistor pad 226 is vertically spaced above the generally planar shoulder portion 275 by a distance of about twice the thickness of the resistive layer 230 that forms the central resistor pad 226. In another embodiment, as illustrated in FIG. 14, generally planar shoulder portion 275 of etched side area 260 has a width (W1) at least one-half the width (W2) of side area 260.

As described in more detail in association with FIGS. 15-16, this low profile sidewall 277 inhibits penetration of the later formed upper layers (e.g., a passivation layer and a cavitation barrier layer) by facilitating more homogenous formation of the respective passivation and cavitation barrier layers over the low profile sidewall 277 of central resistor pad 226. This arrangement, in turn, provides greater strength and integrity to the respective upper passivation and cavitation layers to thereby increase their resistance to penetration by the sometimes corrosive action of inks or other fluids to be ejected.

In one embodiment, the respective low profile, generally planar members 228 (illustrated in FIGS. 12-14) electrically support central resistor pad 226 and correspond to a conductive "tap" that provides power from extension portion 118 (i.e., conductive element 179) of power bus 109 for resistor pad 226 of a single heating element 112. Accordingly, this conductive "tap" extending within the respective heating element 112 (and not outside of the respective heating element 112) has a thickness substantially less than the conductive element 179 (i.e., extension portion 118 of power bus 109) and the conductive element 177 (i.e., transition portion 110 of power bus 109), which both partially define the end boundaries of the respective heating elements 112. However, in another aspect, this conductive "tap" does not include via pad 119 (i.e., conductive element 178), which also is substantially thicker than the conductive "tap."

FIG. 15 is a sectional view of one heating element 112 of a heating region 102 of a printhead assembly 110, according to one embodiment of the present disclosure. FIG. 15 generally corresponds to the sectional view of FIG. 13, except with FIG. 15 illustrating the further formation (on top of the resistive layer 230) of a passivation layer 300, a cavitation barrier layer 302, a chamber layer 304, and an orifice layer 306 including nozzle 308. In one aspect, as illustrated in FIG. 15, chamber layer 304 includes sidewalls 243 that partially define fluid chamber 240, with sidewalls 243 generally corresponding to the sidewalls 243 previously illustrated in FIGS. 10-11.

In one aspect, the passivation layer 300 protects the underlying resistor pad 226 and resistive-covered conductive elements 177, 178, 179 from electrical charging and/or corrosion from the fluids or inks placed within the fluid chamber. In one embodiment, the passivation layer 300 is formed of a material such as aluminum oxide, silicon carbide, silicon nitride, glass, or a silicon nitride/silicon carbide composite with the layer 300 being formed via sputtering, evaporation, or vapor deposition. In one embodiment, the passivation layer 300 comprises a thickness of about 2000 or 4000 Angstroms.

In one aspect, cavitation barrier layer 302 overlying the passivation layer 300 acts to cushion the underlying resistive-covered structures from the force generated by bubble formation upon heating of resistor pad 226. In one embodiment, the cavitation barrier layer 302 comprises a tantalum material. In one embodiment, chamber layer 304 is formed of a polymer material such as photoimpregnable epoxy (commercially available as SU8 from IBM) or other photoimpregnable polymers.

FIG. 15 illustrates a low profile transition 320 of the passivation layer 300 and the cavitation barrier layer 302 that generally replicates the topography of the underlying resistive-covered structure of heating element 112. This low profile topography 320 of the passivation layer 300 and cavitation barrier layer 302 is adjacent the edges 227 of the central resistor pad 226 and is facilitated by generally planar terraced arrangement of conductive shelf 182 relative to resistor pad 226. In one aspect, as previously described the conductive shelf 182 is sized to isolate the much steeper beveled conductive elements 178, 179 away from edges 227 of central resistor pad 226. The low profile topography 320 of the upper layers (adjacent edges 227 of central resistor pad 226) helps to prevent or at least reduce penetration of corrosive inks through those upper layers, and thereby increase the life of the resistor pad 226 of the heating element 112 to increase longevity of the printhead.

FIG. 16 is a sectional view of a heating element 112 of heating region 102 of a printhead, according to one embodiment. FIG. 16 generally corresponds to the structure formed in FIG. 15 except with FIG. 16 generally corresponding to the sectional view of FIG. 14. Accordingly, FIG. 16 illustrates the low profile transition 330 of passivation layer 300 and cavitation barrier layer 302 aligned vertically above the side edges of the underlying central resistor pad 226 as facilitated by the low profile sidewall 277 of central resistor pad 226 relative to the generally planar shoulder portion 275 of side area 260. This generally smoother, low profile topography of the upper layers (i.e., passivation layer 300 and cavitation barrier layer 302) helps to prevent or at least reduce penetration by corrosive inks through those respective upper layers, and thereby increase the life of the resistor pad 226 of the heating element 112 to increase longevity of the printhead. In particular, the low profile sidewall 277 of central resistor pad 226 promotes a more homogeneous formation of the upper layers, resulting in the passivation layer 300 and cavitation barrier layer 302 exhibiting greater strength and integrity in the presence of corrosive inks or other fluids.

Figure 17:
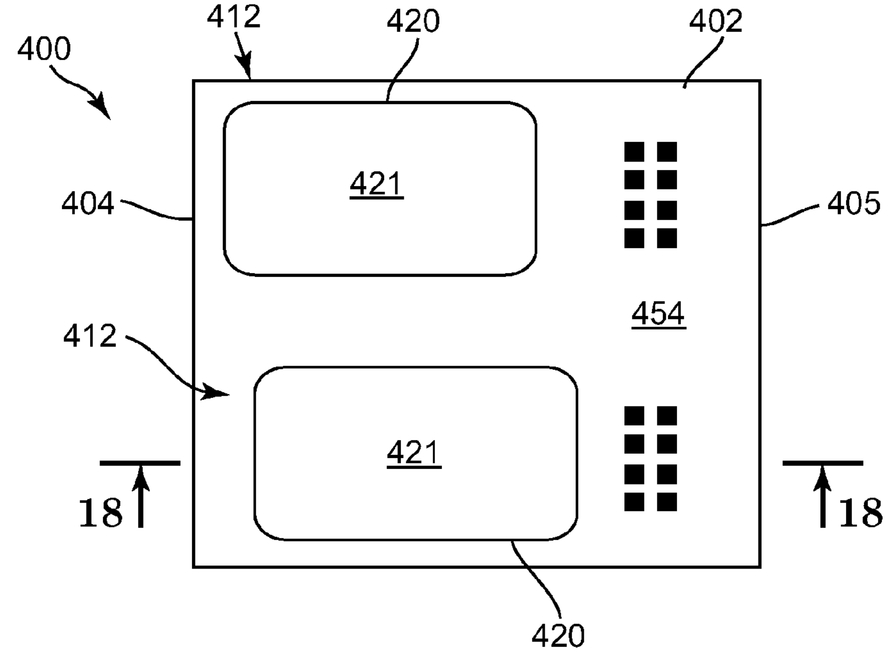
FIG. 17 is a top view illustrating a partially formed heating region of a fluid ejection device, according to one embodiment of the present disclosure.
Figure 18:
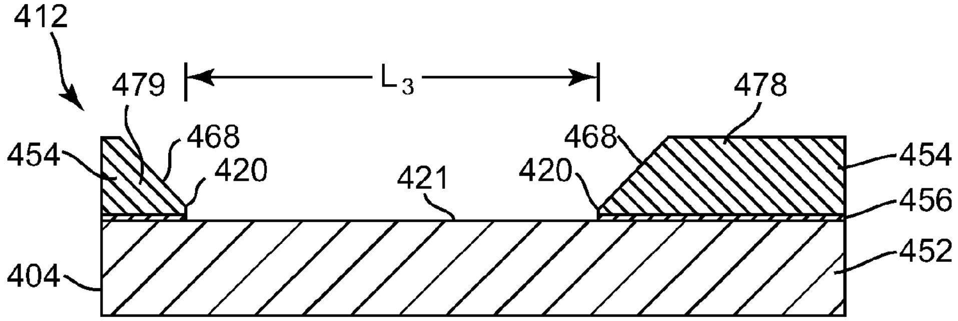
FIG. 18 is a sectional view, as taken along lines 18-18 of FIG. 17, illustrating a partially formed heating region of a fluid ejection device and a method of forming the heating region, according to one embodiment of the present disclosure.

FIGS. 17-25 illustrate another embodiment of a method of forming a heating region 402 of a printhead. FIG. 17 is a top view of a heating element 412 of a partially formed heating region 402 and FIG. 18 is a sectional view of one heating element 412 of the partially formed heating region 402, according to one embodiment of the present disclosure. In this instance, FIG. 17 does not illustrate a main bus region, although it is understood that in one embodiment, the printhead assembly 400 includes a power bus and main bus region in a manner generally corresponding to power bus 109 (including main bus region 111 and transition portion 110) of printhead assembly 400 as previously illustrated in FIG. 12.

Figure 21:
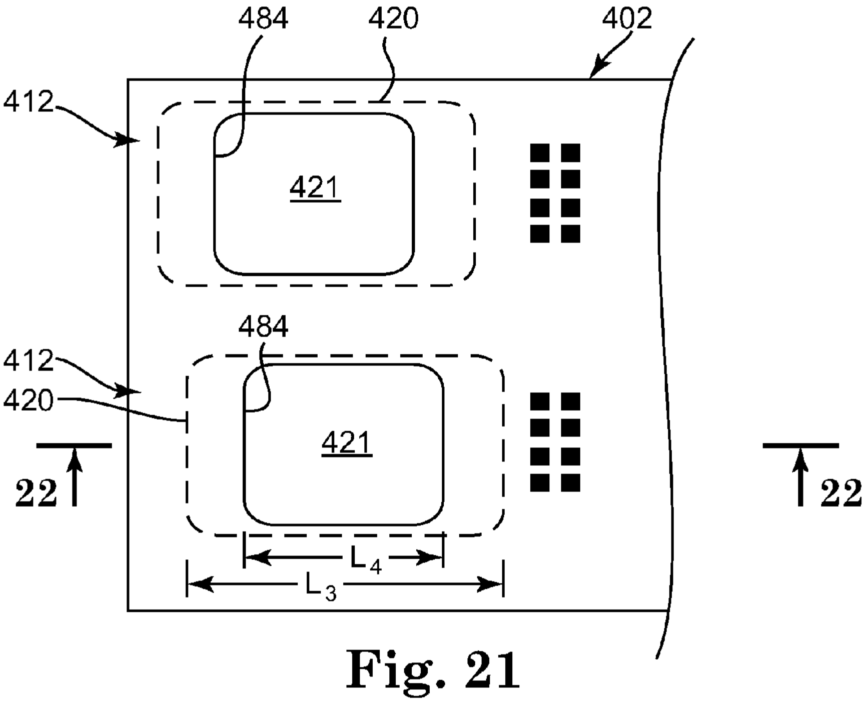
FIG. 21 is a top view illustrating a partially formed heating region of a fluid ejection device and a method of forming the heating region, according to one embodiment of the present disclosure.
Figure 22:
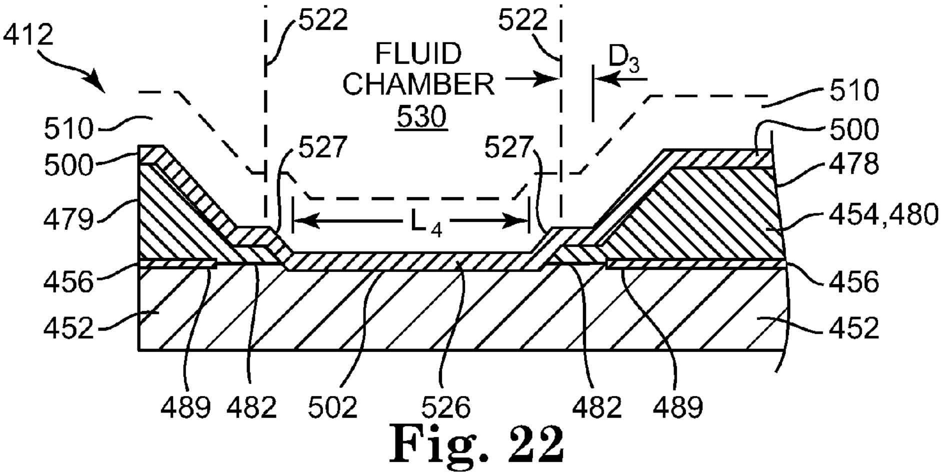
FIG. 22 is a sectional view, as taken along lines 22-22 of FIG. 21, illustrating a partially formed heating region and a method of forming the heating region, according to one embodiment of the present disclosure.

In one embodiment, FIGS. 17 and 18 illustrate forming each heating element 412 by forming a first window 420 within first conductive layer 454. As illustrated in FIGS. 17-18, heating element 412 comprises a first conductive layer 454 overlying an insulation layer 452 (supported by a substrate similar to substrate 151 in FIGS. 4-5) with a neutralizing layer 456 interposed between the first conductive layer 454 and insulation layer 452. In one aspect, heating element 412 comprises first end 404 and second end 405. By etching a portion of first conductive layer 454 and of neutralizing layer 456, a first window 420 is defined in the first conductive layer 454 to expose a top surface 421 of insulation layer 452. This arrangement produces a pair of beveled conductive elements 478, 479 that are spaced apart from each other on opposite sides of first window 420 and with each conductive element 478, 479 defining a beveled surface 468. In one embodiment, first window 420 has a length (L3) that is substantially greater than a length (L4) of the finally formed central resistor pad (FIGS. 20-22).

In one embodiment, the insulation layer 452, first conductive layer 454, and neutralizing layer 456 have substantially the same features and attributes as insulation layer 152, first conductive layer 154, and neutralizing layer 156 as previously described in association with FIGS. 3-16, except for the differences identified throughout the description of remaining FIGS. 17-25.

Figure 19:
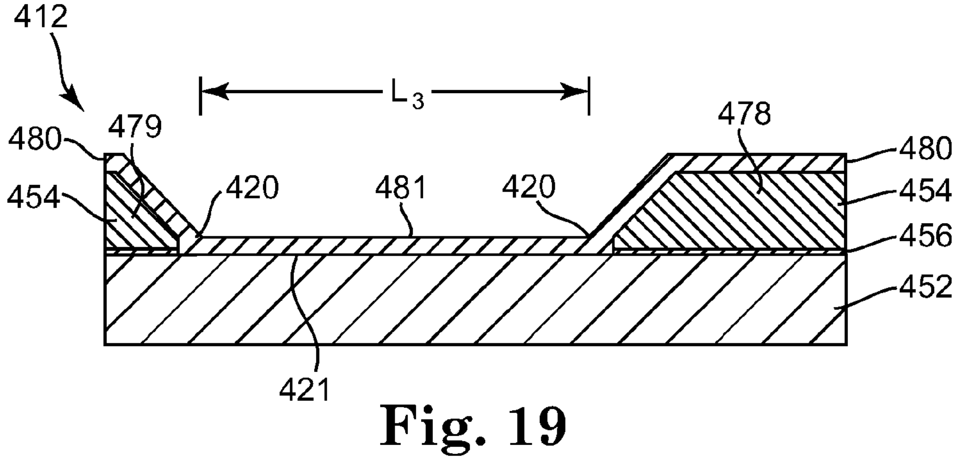
FIG. 19 is a sectional view illustrating a partially formed heating region of a fluid ejection device and a method of forming the heating region, according to one embodiment of the present disclosure.

FIG. 19 is a sectional view generally corresponding to the sectional view of FIG. 18, except illustrating further formation of heating element 412, according to one embodiment of the present disclosure. In particular, FIG. 19 illustrates formation of a second conductive layer 480 over the beveled conductive elements 478, 479 and over the exposed surface 421 of insulation layer 454 within first window 420 to produce central conductive portion 481.

Figure 20:
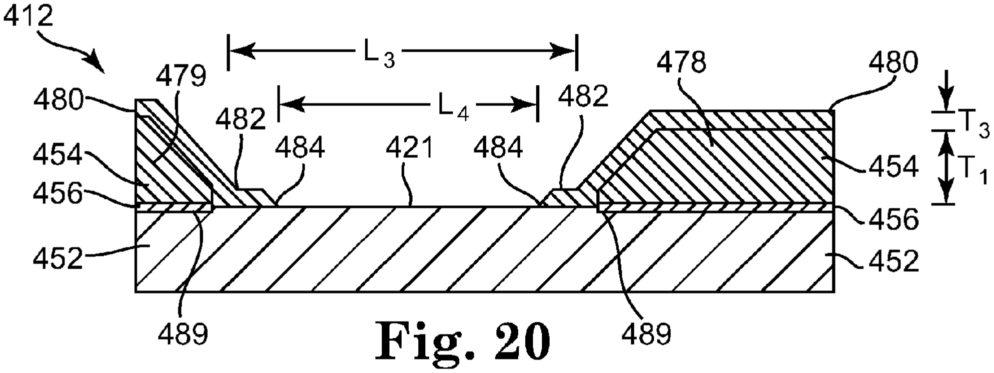
FIG. 20 is a sectional view illustrating a partially formed heating region and a method of forming the heating region, according to one embodiment of the present disclosure.

FIG. 20 is a sectional view generally corresponding to the sectional view of FIG. 19, except illustrating further formation of heating element 412, according to one embodiment of the present disclosure. In particular, FIG. 20 illustrates formation of a second window 484 within second conductive layer 480 to re-expose surface 421 of insulation layer 452 within second window 484. This arrangement produces a conductive shelf 482 extending inward from the respective beveled conductive elements 478, 479. In one embodiment, conductive shelf 482 is a generally planar member.

FIG. 21 provides a top view illustrating the position of second window 484 in a nested relationship relative to first window 420 with second window 484 being sized smaller than first window 420. In one embodiment, second window 484 defines a length (L4) corresponding to a length of a fully formed central resistor pad 526 (FIG. 22).

In a manner substantially the same as the formation of heating region 102 previously described in association with FIGS. 3-16, the first conductive layer 452 of each heating element 412 has a thickness (T1) substantially greater than a thickness (T3) of second conductive layer 480, as illustrated in FIG. 20. In one embodiment, conductive shelf 482 has a thickness generally corresponding to a thickness (T3) of the second conductive layer 480. In one embodiment, the thickness of the conductive elements 478, 479 (both before and after addition of the second conductive layer 480) is substantially greater than a thickness (T3) of the conductive shelf 482. In one embodiment, the first conductive layer 454 has a thickness (T1) of about 4000 Angstroms and the second conductive layer 480 has a thickness (T3) of about 1000 Angstroms. Accordingly, in this embodiment, after formation of the second conductive layer 480, conductive elements 478, 479 have a total thickness of about 5000 Angstroms while conductive shelf 482 has a total thickness of about 1000 Angstroms.

In another embodiment, the first conductive layer 454 has a thickness (T1) of about 3000 Angstroms and the second conductive layer 480 has a thickness (T3) of about 2000 Angstroms. Accordingly, in this embodiment, after formation of the second conductive layer 480, conductive elements 478, 479 have a total thickness of about 5000 Angstroms while conductive shelf 482 has a total thickness of about 2000 Angstroms.

FIG. 22 is a sectional view of one heating element 412 of a partially formed heating region 402, according to one embodiment of the present disclosure. FIG. 22 illustrates the further formation of a resistive layer 500 to overlie the respective beveled conductive elements 478, 479, to overlie conductive shelf 482, and to overlie exposed surface 421 of insulation layer 454 within second window 484. In one aspect, the resistive layer 500 forms a central resistor pad 526 within second window 484 between opposite portions of conductive shelf 482 (extending inward from opposed respective conductive elements 478, 479). In one embodiment, the resistive layer 500 comprises substantially the same features and attributes as resistive layer 230 (previously described in association with FIGS. 3-16), including the resistive layer 500 having a thickness of about 1000 Angstroms. As previously described in association with FIGS. 20-21, the central resistor pad 526 has a length (L4) defined by second window 484 (formed within second conductive layer 500) that is less than a length (L3) defined by first window 420 (formed within first conductive layer 452).

As illustrated in FIG. 22, upper layers 510 (including a passivation layer and/or a cavitation barrier layer) and walls 522 of a fluid chamber 530 extend vertically above the resistive layer 500, in a manner substantially the same as for heating element 112 previously illustrated in association with FIGS. 10-11 and 15-16. In particular, in one embodiment, a width of conductive shelf 482 (and consequently a generally planar member like generally planar member 228 of FIGS. 10-11) is selected so that each sidewall 522 of fluid chamber 530 is vertically aligned above conductive shelf 482 with an outer portion of conductive shelf 482 spaced apart from sidewall 522 by a distance (D3) and thereby located externally of the fluid chamber 530. Accordingly, the more abrupt transition between the conductive shelf 482 and the respective conductive elements 478, 479 (that would otherwise lead to breach of the upper layers by corrosive inks) is isolated from the fluid chamber 530. Instead, the low profile transition 527 between the resistive-covered conductive shelf 482 and the central resistor pad 526 is positioned within a boundary of the fluid chamber 530 (as defined by sidewalls 522). This low profile of the generally planar, resistive-covered conductive shelf 482 enables the later formed upper layers 510 (e.g., a passivation layer and a cavitation barrier layer) to form a low profile transition 527 over the edge of the central resistor pad 526 at the location of the conductive shelf 482. Placement of this generally smoother, low profile transition 527 within fluid chamber 530, in turn, increases the integrity and strength of the passivation and cavitation layers because the formation of those layers occurs more homogenously without the conventional abrupt beveled conductive elements (that border conventional resistor pads) that are typically aligned within the boundaries of a fluid chamber.

In another embodiment, this arrangement additionally comprises edge 489 of neutralizing layer 456 being spaced apart from sidewall 522 of fluid chamber 530 by a distance (D3), and located externally of fluid chamber 530.

Figure 23:
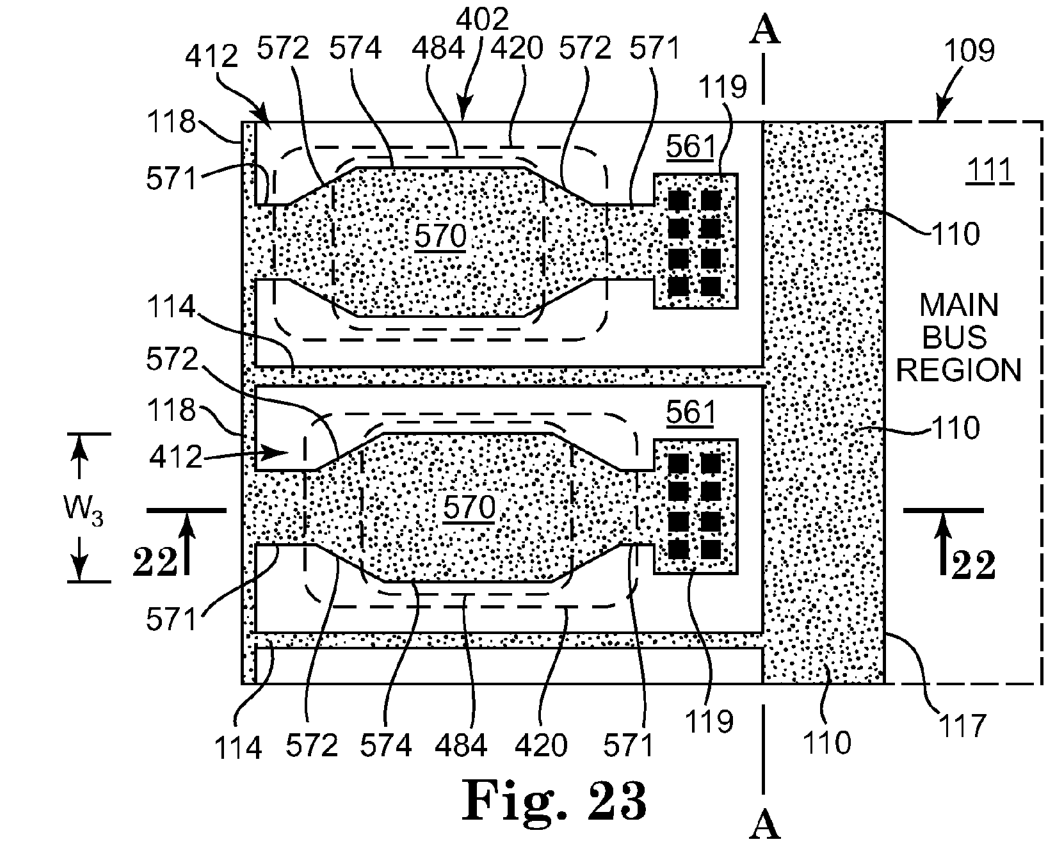
FIG. 23 is a top view illustrating a partially formed heating region of a fluid ejection device and a method of forming the heating region, according to one embodiment of the present disclosure.

FIG. 23 is a top view illustrating a partially formed heating region 402 and main bus region 111 of a printhead assembly and a method of forming the heating region 402 according to one embodiment of the present disclosure. In particular, FIG. 23 illustrates a method of forming a sidewall of a resistor strip 570 of each heating element 412 of region 402. In one embodiment, a power bus 109, including transition portion 110 and extension portions 114, 118, as well as via pad 119, have substantially the same features and attributes as those elements as previously described and illustrated in association with FIGS. 3-16. In one embodiment, select areas including transition portion 110, extension portions 114, 118, and via pad 119 are masked (as represented by shading) while material is etched simultaneously from both the non-masked side areas 561 of the heating region 402 and the non-masked bus region 111.

In one aspect, a partially formed resistor strip 570 is also masked with the resistor strip 570 including two opposite end portions 571, opposite necked portions 572, and a central portion 574 interposed between the respective necked portions 572. The central portion 574 has a width (W3) as illustrated in FIG. 23 that is substantially greater than a width (W4) of the finally formed resistor strip 570 illustrated in FIGS. 24 and 25. In one aspect, side area 561 extends outward from opposite sides of the partially formed resistor strip 570 until reaching masked extension portion 114, with the non-masked side area 561 also surrounding the masked via pad 119. In one aspect, masked extension portion 118 generally corresponds to resistive-covered conductive element 479, masked via pad 119 generally corresponds to resistive-covered conductive element 478, and masked transition portion 110 generally corresponds to a resistive-covered conductive element (analogous to element 177 in FIGS. 12-13 and 15).

Figure 25:
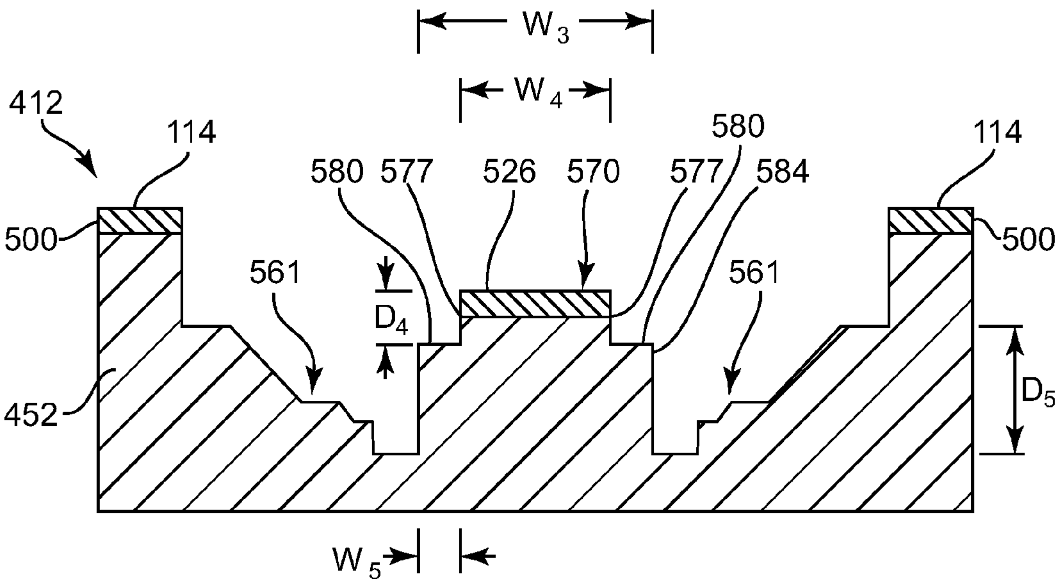
FIG. 25 is a sectional view illustrating a partially formed heating region of a fluid ejection device, according to one embodiment of the present disclosure.

Using this arrangement, etching is performed simultaneously on both the non-masked side area 561 of each heating element 412 of heating region 402 and the non-masked main bus region 111 at a depth (D5 as shown in FIG. 25) sufficient to remove the resistive layer 500, the second conductive layer 480, and a substantial portion of the first conductive layer 454. In one embodiment, this etching is considered a deep etching because it removes at least about 4000-5000 Angstroms of material.

Figure 24:
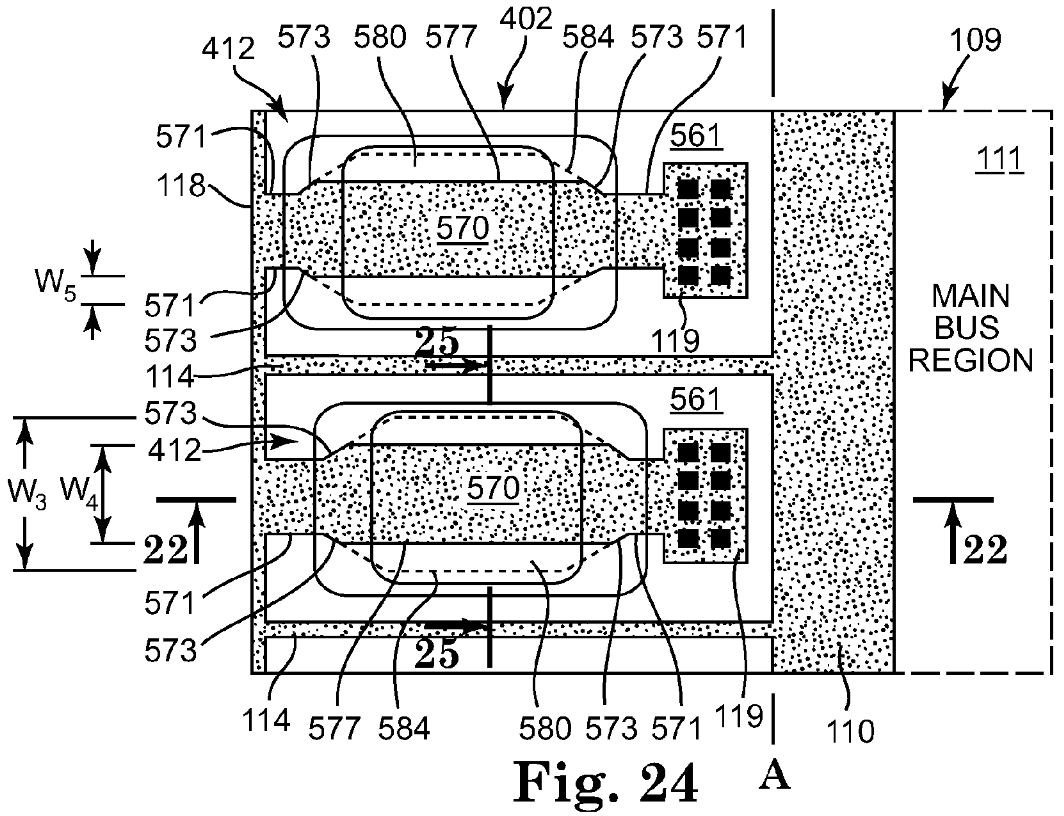
FIG. 24 is a top view illustrating a partially formed heating region of a fluid ejection device and a method of forming the heating region, according to one embodiment of the present disclosure.

FIG. 24 is a top view illustrating a partially formed heating region 402 and main bus region 111, according to one embodiment of the present disclosure. FIG. 24 illustrates additional formation of resistor strip 570, which includes protecting or masking substantially the entire heating region 402, transition portion 110, and main bus region 111 except for a shoulder area (represented generally by dashed lines 584) on the opposite sides of the partially formed resistor strip 570 of FIG. 23. Upon etching this pair of shoulder areas 584, a sidewall 577 of a finally formed resistor strip 570 is defined while exposing a shoulder portion 580 of side area 561, as illustrated in both FIGS. 24-25.

In one embodiment, a width (W5) of the etched shoulder area 584 of resistor strip 570 is selected to so that a truncated portion 573 of necked portion 572 is retained, with truncated portion 573 extending from each respective end portion 571 to sidewall 577 of resistor strip 570. Retaining this truncated necked portion 573 compensates for any mis-registration that possibly occurs from the sequence of two etching steps of side area 560 that are performed to define the final resistor strip 570. In other words, truncated necked portion 573 insures that the partially formed resistor strip 570 includes a slightly greater width adjacent end portion 571 to accommodate variations caused by multiple etching steps used to define the sidewall 577 of the resistor strip 570. Accordingly, this arrangement prevents or at least reduces formation of an irregularly defined transition between sidewall 577 and end portions 571 of resistor strip 570, which otherwise could potentially hamper current flow in that region, among other possibly undesirable results.

FIG. 25 is a sectional view taken along lines 25-25 of FIG. 24 and illustrates a low profile sidewall 577 of central resistor pad 526 of one heating element 412 of heating region 402, according to one embodiment of the present disclosure. As illustrated in FIG. 25, heating element 412 comprises resistor strip 570 with side areas 561 extending laterally outward from resistor strip 570. In one aspect, shoulder portion 580 of side areas 561 is immediately adjacent to, and extends laterally outward from, the respective sidewalls 577 of central resistor pad 526. In one aspect, shoulder portion 580 of side areas 561 is formed via etching of the shoulder area 584, as illustrated in FIGS. 23-24.

In one embodiment, as illustrated in FIG. 25, a top surface of the central resistor pad 526 is vertically spaced apart from the shoulder portion 580 of side area 561 by a distance (D4) generally corresponding to the thickness of material removed in the shallow etching step represented by FIG. 24. In one aspect, this distance is about 2000 Angstroms.

It is understood that, in a manner substantially the same as previously illustrated in FIGS. 15-16, formation of heating region 402 is completed with the addition of upper layers (e.g., a passivation layer and a cavitation barrier layer) and a chamber layer to form a fluid chamber positioned vertically above central resistor pad 526 of heating element 412 illustrated in FIG. 25. Accordingly, in one embodiment, the heating element 412 illustrated in FIG. 25 also provides at least some of substantially the same features and attributes of heating region shown in FIGS. 15-16. In particular, the embodiment of heating element 412 of heating region 402 provides a low profile sidewall 577 of a central resistor pad 526 (FIG. 25) and/or a low profile, terraced end portion (i.e., conductive shelf 482) for a central resistor pad 526 (FIG. 22), as illustrated in FIG. 22. In one embodiment, a low profile sidewall 577 of central resistor pad 526, as illustrated in FIG. 25, substantially enhances the longevity of a heating element of a heating region of a printhead by promoting more homogeneous and stronger formation of the upper passivation and cavitation barrier layers overlying the respective resistive and conductive layers. In another embodiment, a low profile resistive-conductive transition (i.e., a transition from the central resistor pad 526 to adjacent generally planar conductive shelf 482) underlying the fluid chamber 530 acts to isolate more abrupt beveled conductive elements (e.g., conductive elements 478, 479) away from the fluid chamber 530. This low resistive-conductive transition substantially enhances the longevity of the heating element 412 of heating region 402 of a printhead assembly by promoting more homogeneous and stronger formation of the upper passivation and cavitation barrier layers overlying the respective resistive and conductive layers.

Figure 27:
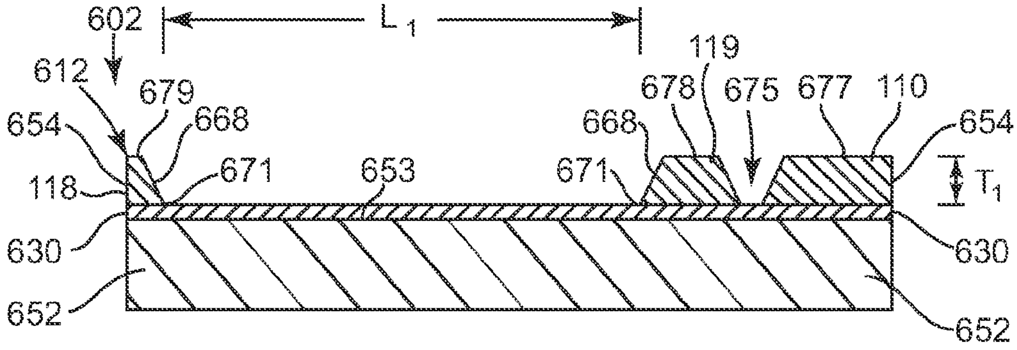
FIG. 27 is a sectional view illustrating a method of forming a heating region of a fluid ejection device, according to one embodiment of the present disclosure.
Figure 28:
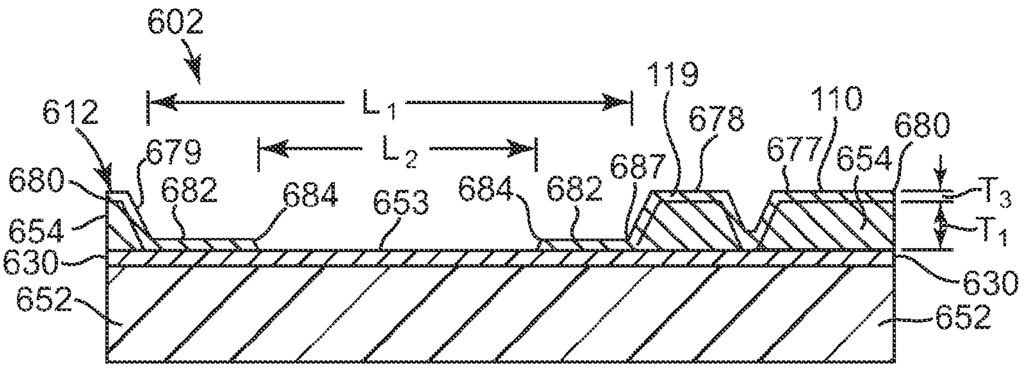
FIG. 28 is a sectional view illustrating a method of forming a heating region of a fluid ejection device, according to one embodiment of the present disclosure.
Figure 29:
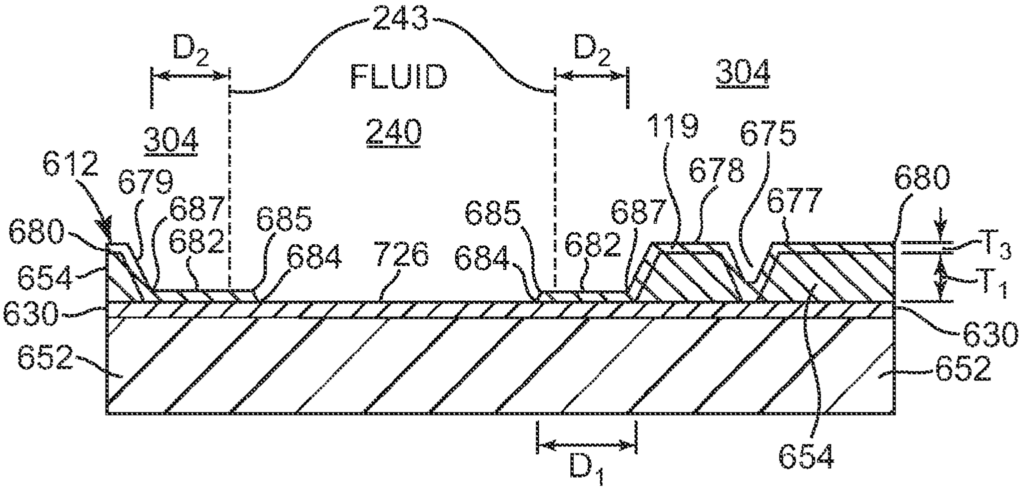
FIG. 29 is a sectional view further illustrating the embodiment of FIG. 28, according to one embodiment of the present disclosure.

FIGS. 26-32 illustrate a method of forming a heating element 612 of a heating region 602, according to one embodiment of the present disclosure, in which a resistive layer that forms a resistor pad also underlies the conductive traces that are located on opposite ends of the resistor pad 726 (illustrated in FIG. 29). In contrast, the earlier embodiments of FIGS. 3-25 include a resistive layer 230 (FIGS. 3-16) or 500 (FIGS. 17-25) that overlies the respective conductive traces located at opposite ends of the respective resistor pads 226 (FIG. 13), 526 (FIG. 22). In one embodiment, a method of forming heating element 612 comprises substantially the same features and attributes as a method of forming the respective heating elements 112, 412, as previously described and illustrated in association with FIGS. 1-25, respectively, except for the differences noted in association with FIGS. 26-32.

Figure 26:
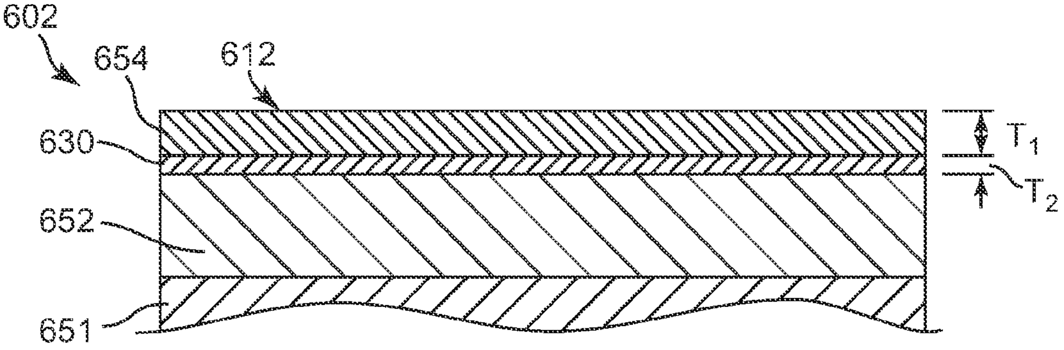
FIG. 26 is a sectional view illustrating a method of forming a heating region of a fluid ejection device, according to one embodiment of the present disclosure.

FIG. 26 is a sectional view of one heating element 612 (of a plurality of similar heating elements) of partially formed heating region 602, according to one embodiment of the present disclosure, and substantially similar to the view of FIG. 4 except for the different order of respective thin film layers. FIG. 26 illustrates a first conductive layer 654 on top of a resistive layer 630, as well as an insulation layer 652 and supporting substrate 651. In one aspect, first conductive layer 654 has a thickness (T1) while resistive layer 630 has thickness (T2).

FIG. 27 is a sectional view of heating element 612 of a partially formed heating region 602, according to one embodiment of the present disclosure, and illustrates formation of a first window 671 within first conductive layer 654 with first window defining a length (L1). In one embodiment, first window 671 of heating element 612 is formed in a manner substantially the same as previously described for first window 171 of heating element 112, in association with FIGS. 5-6, except for the differences noted below. In particular, wet etching is applied to first conductive layer 654 with a stop on resistive layer 630 (to preserve resistive layer 630) to define first window 671 and thereby expose resistive layer 630 between a pair of spaced apart conductive elements 678, 679. In one aspect, conductive elements 678, 679 respectively correspond to a via pad 119 and an extension portion 118 of a power bus (as illustrated in FIG. 5). In addition, at the same time, a slot 675 is defined between conductive element 678 and conductive element 677 (e.g., a transition portion 110 of a power bus).

In one embodiment, respective conductive elements 678, 679 are spaced apart from each other on opposite ends of the first window 671 with each respective conductive element 678, 679 including a beveled surface 668 so that the beveled surfaces 668 of the respective conductive elements 678, 679 face each other. In one aspect, each respective conductive element 678, 679 retains the thickness T1 of first conductive layer 654.

FIG. 28 is a sectional view of one heating element 612 of the partially formed heating region 602, according to one embodiment of the present disclosure. FIG. 29 is an enlarged partial sectional view further illustrating the embodiment of FIG. 28. As illustrated in FIG. 28, a second conductive layer 680 is deposited over the entire heating element 612 and then the area defining second window 684 is wet etched in the second conductive layer 680 with a stop on the material of the resistive layer 630 without other areas being wet etched. This action re-exposes and preserves surface 653 of resistive layer 630. In another aspect, with the addition of the second conductive layer 680 and formation of second window 684, each respective conductive element 677, 678, 679 defines a thicker conductive component while slot 675 is partially filled in by second conductive layer 680.

As illustrated in FIGS. 28-29, the formation of second window 684 also partially defines conductive shelf 682. In one aspect, except for the difference of resistive layer 630 extending underneath conductive elements 677, 678, 679, conductive shelf 682 of heating element 612 comprises substantially the same features and attributes as conductive shelf 182 previously described and illustrated in association with FIGS. 7-15.

Accordingly, in one aspect, as illustrated in FIGS. 28-29, the conductive shelf 682 comprises an inner portion 685 and an outer portion 687. The outer portion 687 is in contact with, and extends inwardly from, respective conductive elements 678, 679 while the inner portion 685 (i.e., inner edge) of the conductive shelf 682 defines second window 684. In another aspect, the inner portion 685 of conductive shelf 682 also defines a length (L2) of a central resistor pad 226 within second window 684. In one aspect, the length (L1) of first window 671 is greater than the length (L2) of second window 684 and generally corresponds to a length of heating element 612.

In one embodiment, as illustrated in FIGS. 28-29, conductive shelf 682 defines a generally planar member that forms a generally terraced pattern relative to the respective conductive elements 678, 679 and relative to the surface 653 of resistive layer 652. In comparison to heating element 112 (FIGS. 3-16), conductive shelf 682 generally corresponds to generally planar member 228 that defines a conductive "tap" of a power bus and feeds the resistor pad 726 of one heating element 612 and not other heating elements.

In one embodiment, as illustrated in FIGS. 28-29, conductive shelf 682 has a thickness generally corresponding to a thickness (T3) of the second conductive layer 680. In one embodiment, the thickness (T1) of each respective conductive element 677, 678, 679 is substantially greater than a thickness of the conductive shelf 682. In one embodiment, the first conductive layer 654 has a thickness (T1) of about 4000 Angstroms and the second conductive layer 680 has a thickness (T3) of about 1000 Angstroms. Accordingly, in this embodiment, after formation of the second conductive layer 680, conductive elements 677, 678, 679 have a total thickness of about 5000 Angstroms while conductive shelf 682 has a total thickness of about 1000 Angstroms.

In another embodiment, the first conductive layer 654 has a thickness (T1) of about 3000 Angstroms and the second conductive layer 680 has a thickness (T3) of about 2000 Angstroms. Accordingly, in this embodiment, after formation of the second conductive layer 680, conductive elements 677, 678, 679 have a total thickness of about 5000 Angstroms while conductive shelf 682 has a total thickness of about 2000 Angstroms.

In one embodiment, as illustrated in FIG. 29, inner portion 685 of conductive shelf 682 defines a first junction relative to resistor pad 726 and outer portion 687 of conductive shelf 682 defines a second junction relative to beveled surface 686 of each respective conductive element 678, 679. In one aspect, the first junction forms a low profile topography (or a low profile transition) because the thickness (T3) of the conductive shelf 682 is relatively minimal relative to resistor pad 726 while the second junction provides a generally steep or abrupt junction because the thickness (T1) of the respective conductive elements 678, 679 is substantially greater than the thickness (T3) of the conductive shelf 682.

In one aspect, later steps in forming the heating elements 612 of the heating region 602 result in formation of a fluid chamber 240 defined by sidewalls (represented by dashed lines 243) of a chamber layer 304, as illustrated in FIG. 29. Accordingly, in one embodiment, a width (D1) of conductive shelf 682 is selected so that each respective sidewall 243 of fluid chamber 240 is vertically aligned above conductive shelf 682 to position the outer portion 687 of conductive shelf 682 to be spaced apart from each respective sidewall 243 by a distance (D2). This positioning of sidewall 243 of fluid chamber 240 (relative to outer portion 687 of conductive shelf 182) isolates outer portion 687 of conductive shelf 682 externally of the fluid chamber 240. In one aspect, as illustrated in FIG. 29, a width (D1) of the conductive shelf 682 isolates, away from fluid chamber 240, the more abrupt transition between the outer portion 687 of conductive shelf 682 and the respective conductive elements 678, 679.

Moreover, the low profile of this generally planar member (substantially defined by the generally planar conductive shelf 682) relative to central resistor pad 726 enables the later formed passivation layer and cavitation barrier layers to form smoother, low profile transitions over the outer edge of the central resistor pad 726 at its junction with inner portion 685 of the conductive shelf 682. These low profile transitions, in turn, increase the integrity and strength of the passivation and cavitation layers because the formation of those layers occurs more homogenously that otherwise would occur at the conventional high profile transition (formed between a conventional resistor length and conventional steep or abrupt beveled conductive elements that border conventional resistor pads).

Figure 30:
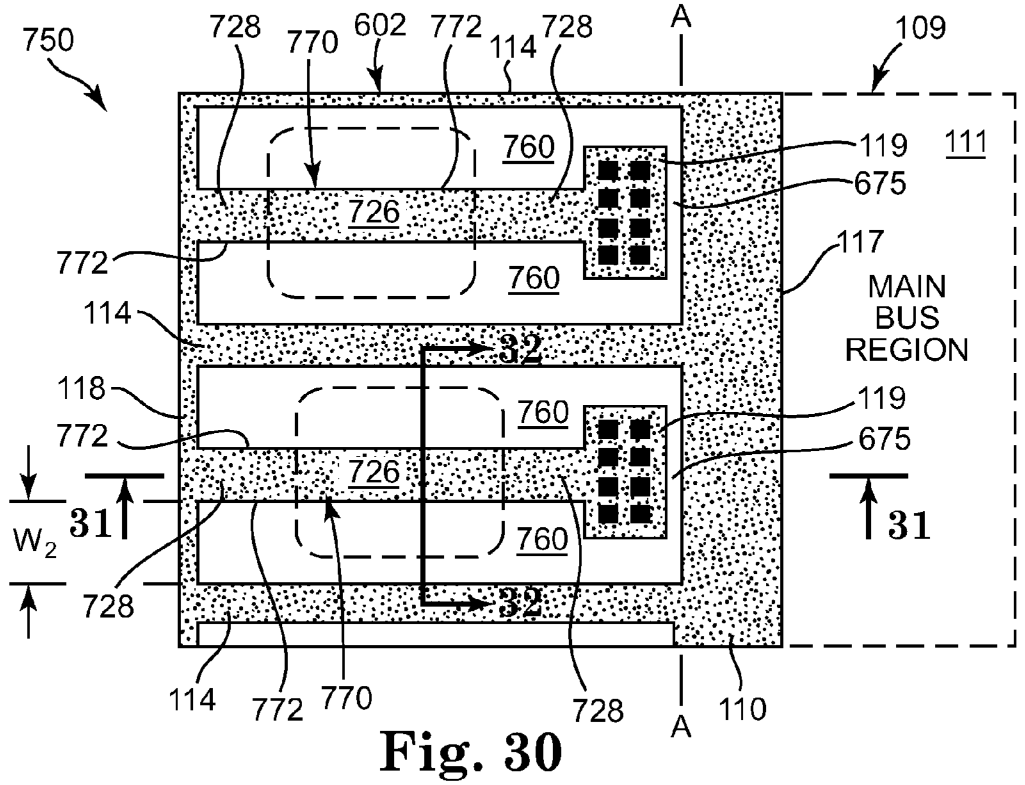
FIG. 30 is a top view of a partially formed heating region of a fluid ejection device and illustrating a method of forming the heating region, according to one embodiment of the present disclosure.
Figure 31:
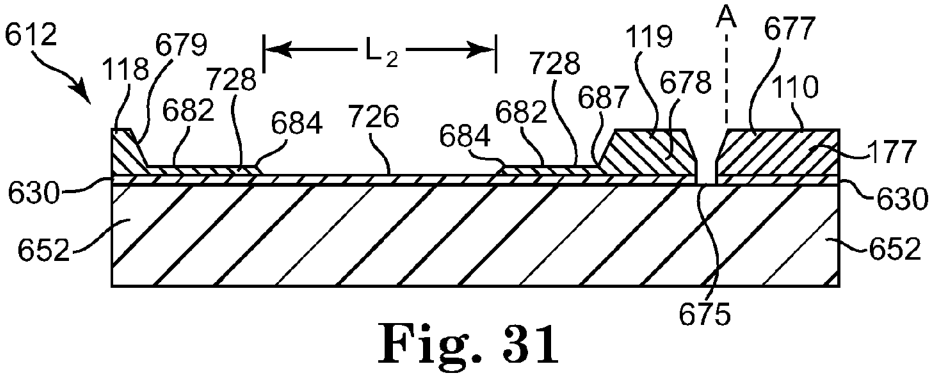
FIG. 31 is a sectional view as taken along lines 31-31 of FIG. 30 and illustrates a method of forming a heating region of a fluid ejection device, according to one embodiment of the present disclosure.
Figure 32:
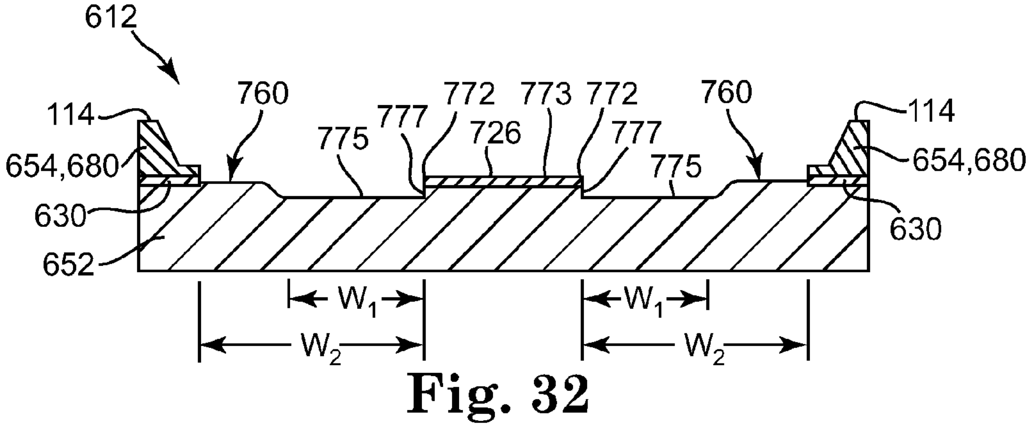
FIG. 32 is a sectional view as taken along lines 32-32 of FIG. 30 and illustrates a method of forming a heating region of a fluid ejection device, according to one embodiment of the present disclosure.

FIG. 30 is a top view of a partially formed heating region 602 and FIG. 31 is a sectional view, as taken along lines 31-31 of FIG. 30, of one heating element 612 of the partially formed heating region 602, according to one embodiment of the present disclosure. FIG. 31 illustrates the generally terraced arrangement of the generally planar member 728 (defined by conductive shelf 682) relative to conductive elements 678, 679 and relative to central resistor pad 726 of the heating region 602. FIG. 32 is a sectional view taken along lines 32-32 of FIG. 30 and illustrates a low profile sidewall 777 of central resistor pad 726 of heating element 612 of heating region 602.

FIGS. 30-32 illustrate one embodiment of a method of further formation of the heating region 602 of the embodiments of FIGS. 26-29. In one aspect, the method comprises preserving or protecting substantially the entire heating 602 region (having the structure shown in FIG. 28) via masking over the entire heating region 602 while etching the main bus region 111 to remove at least a conductive layer, a resistive layer, and/or other layers. In one embodiment, this etching step is a "deep etching" step in which at least about 4000-5000 Angstroms of conductive material (and/or other material) and at least the resistive layer 630 (e.g., about 1000 Angstroms) is removed from the main bus region 111. At the same time, no material is removed from the heating region 602. Accordingly, upon etching of the main bus region 111 (and not other areas of the heating region 602), the structure of the heating region 602 as illustrated in FIG. 30 is generally unaffected.

Next, as illustrated via FIG. 30, while preserving the main bus region 111, select areas (including transition portion 110, extension portions 114, 118, via pad 119, resistor pad 726, and generally planar members 728) are masked, as represented by shading. Side areas 760 are then etched to remove both resistive layer 630 and second conductive layer 680 from the respective side areas 760 of each respective heating element 612. In one embodiment, central resistor pad 726 and conductive-covered planar member 728 define a resistor strip 770 with side areas 760 extending laterally outward in opposite directions from side edges 772 of resistor strip 770. In one aspect, side areas 760 also surround masked via pad 119. In one aspect, masked extension portion 118 generally corresponds to conductive element 679 illustrated in FIG. 31, masked via pad 119 generally corresponds to conductive element 678 illustrated in FIG. 31, and masked transition portion 110 generally corresponds to conductive element 677 illustrated in FIG. 31.

As illustrated in FIG. 32, etching the side areas 760 of heating region 602 separately from the etching of main bus region 111 facilitates removal from the side areas 760 of a relatively shallow depth of both the resistive layer 630 (e.g., about 1000 Angstroms) and the second conductive layer 680 (e.g., about 1000 Angstroms). This "shallow etching" results in etched side area 760 defining a generally planar shoulder portion 775 immediately adjacent side edges 772 of central resistor pad 726, as illustrated in FIG. 32. This arrangement produces a low profile sidewall 777 of central resistor pad 726 of resistor strip 770. In one embodiment, this low profile sidewall 777 has a thickness of about 2000 Angstroms, generally corresponding to the thickness of material removed in the shallow etching step represented by FIGS. 30 and 32.

Accordingly, in one embodiment, a top surface 773 of the central resistor pad 726 is vertically spaced above the generally planar shoulder portion 775 by a distance of about twice the thickness of the resistive layer 630 that forms the central resistor pad 726. In another embodiment, as illustrated in FIG. 32, generally planar shoulder portion 775 of etched side area 760 has a width (W1) at least one-half the width (W2) of side area 760.

In a manner similar to that described for heating element 112 in association with FIGS. 15-16, this low profile sidewall 777 inhibits penetration of the later formed upper layers (e.g., a passivation layer and a cavitation barrier layer) by facilitating more homogenous formation of the respective passivation and cavitation barrier layers over the low profile sidewall 777 of central resistor pad 726. This arrangement, in turn, provides greater strength and integrity to the respective upper passivation and cavitation layers to thereby increase their resistance to penetration by the sometimes corrosive action of inks or other fluids to be ejected.

In another embodiment, the heating element 612 illustrated in FIGS. 31-32 is formed via a method substantially the same as that shown in FIGS. 17-25, except for at least the following differences. In one aspect, resistive layer 630 underlies the first conductive layer and second conductive layers so that a first window (like first window 420 in FIGS. 17-18) and a second window (like second window 484 in FIGS. 20-21) is formed via wet etching while placing a stop to prevent or at least reduce etching of resistive layer 630.

Another aspect of providing a low profile topography surrounding a resistor region of a heating element relates to the thermal effects that occur within a heating element during heating of the resistor region. For instance, in conventional printheads, during heating of the resistor region a significant amount of heat is lost by transfer to the unintended target of the thin film layers laterally surrounding the ends of the resistor region. In particular, the conductive traces at the ends of the resistor region provide a mechanism that undesirably transfers heat away from the resistor region.

Accordingly, in one embodiment of the present disclosure, the conductive elements (e.g., conductive elements 178, 179 in FIGS. 7-15) form a relatively thin conductive shelf 182 to substantially decrease the volume of heat-conductive material adjacent resistor pad 226. This arrangement minimizes the amount of heat transferred away from the resistor pad 226 so that substantially all the heat generated by the resistor pad 226 would be transferred vertically into the ink to increase the thermal efficiency of the heating element 112.

In one embodiment, each conductive shelf 182 of heating element 112 (illustrated in FIGS. 8-11) have a width D1 and include a portion located outside the wall of the fluid chamber having a width D2. In one embodiment, D1 is at least 10 microns. In another embodiment, D1 is less than 10 microns. In one aspect, the width D1 of the low profile conductive shelf 182 is selected to effectively remove what would otherwise be a generally thick portion of a conventional conductive trace that would transfer heat away from the intended target (e.g. ink or other fluids). Accordingly, with the embodiment of FIGS. 7-15, the conductive shelf 182 presents a conductive area adjacent the resistor pad 226 having a thickness substantially less than the thickness of the remaining conductive element 178, 179 (e.g. 5000 Angstrom). While the embodiments of FIGS. 7-12 indicate that the thickness T3 of the conductive shelf is about 1000 Angstroms or 2000 Angstroms, conductive shelf 182 can have greater thicknesses (e.g., 3000 Angstroms) with the understanding that maintaining the greater thicknesses of the conductive shelf 182 will diminish the intended benefit of decreasing the heat loss to the conductive traces. However, it is understood that the larger main power bus from which conductive elements 177, 178, 179 extend is not reduced in thickness throughout the die because that would result in significant parasitic losses.

The distance that the conductive shelf 182 is to be thinned to achieve increased thermal efficiency depends on the type of conductive material and the duration of the pulse width of firing the resistor pad. In one aspect, this general relationship regarding the distance that heat is diffused is expressed by the equation $(\alpha^*t)^{1/2}$, where $\alpha$ is the thermal diffusivity of the material. In one example, where Aluminum is the conductive material, the thermal diffusivity ($\alpha$) equals 96 microns$^2$ per microsecond. Accordingly, based on a typical pulse width of heating, about at least a 10 micron region of the conductive traces (i.e., taps) surrounding a resistor pad would channel heat away from the resistor pad. Therefore thinning the conductive taps in a region about 10 microns length (extending outward from the resistor pad) will substantially reduce the amount of heat transferred from the resistor pad into the conductive traces. Of course, where materials other than Aluminum are used, then the thermal diffusivity represented by $\alpha$ will be different, resulting in an increase or decrease of the length of the conductive layer to be thinned, depending upon the degree to which that material is thermally conductive. In addition, because the area of the conductive layer that is thinned is small relative to the full length of the conductive traces of the entire power bus, this locally thinned area will produce minimal parasitic loss on the conductive trace throughout the entire power bus.

This increased thermal efficiency results in lower peak temperatures of a printhead, faster print speeds, as well as enhanced print quality. The increased thermal efficiency is believed to enable higher printhead firing frequencies and/or increased printhead throughput (via reduction of thermal pacing). In another aspect, the printhead is more robust because of less thermally-driven material degradation and because the printhead will be less susceptible to ink outgassing. In one aspect, the increased thermal efficiency of the printhead reduces the power consumption used to operate the printhead, thereby reducing the operating cost of the printer because less expensive power supplies can be used.

In another aspect, the increased thermal efficiency of the printhead offers enhanced resistor life and enhanced kogation, resulting in fewer residue deposits from heating the ink. This feature results from a reduction in the peak temperature of the surface of the resistor pad (e.g., Tantalum layer) and/or less temperature variation over the resistor pad, allowing the printhead to be operated at a lower overenergy.

In another embodiment, these thermal benefits are achieved via decreasing a width of a conductive tap (a portion of a conductive trace surrounding a resistor pad) relative to the width of the resistor pad. This decreased width of the conductive tap immediately adjacent a resistor pad (e.g., within about 10 microns of the resistor pad) substantially decreases the volume of heat conductive material near the resistor pad. This volume reduction of the conductive taps effectively removes an unintended target for the heat generated by the resistor pad. In one embodiment, substantially the entire length of the conductive taps is reduced in width while in another embodiment, a portion of the length of the conductive taps are reduced in width while other portions are not reduced in width.

In one aspect, the reduced width of these conductive taps effectively minimizes heat transfer from the resistor pad to the conductive taps, thereby increasing the thermal efficiency of heating element because most of the generated heat acts directly on the fluid in the chamber (rather than being dissipated into surrounding thin film layers). Accordingly, this embodiment enjoys substantially the same thermal benefits as those previously described for the embodiment of the low profile, conductive shelf 182 (FIGS. 1-16).

Figure 33:
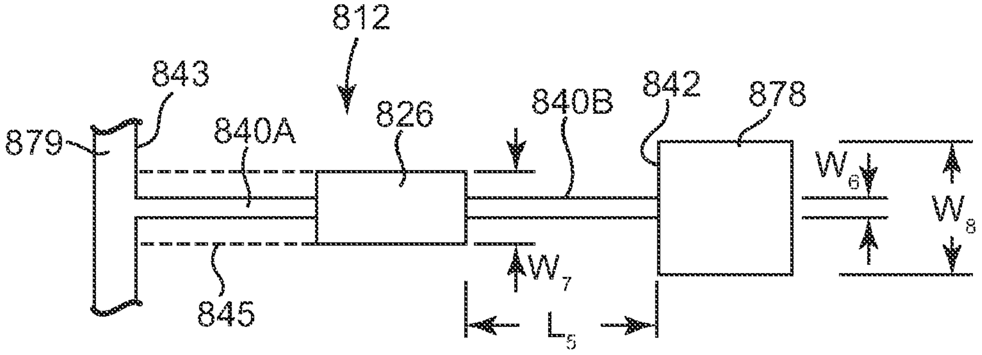
FIG. 33 is a top view of a resistor strip of a heating element of a printhead, according to one embodiment of the present disclosure.

FIG. 33 illustrates a top view of a heating element 812, according to one embodiment of the present disclosure. In one embodiment, heating element 812 comprises substantially the same features and attributes of heating elements 112, 412, or 612, as previously described and illustrated in association with FIGS. 1-32, respectively, except for the differences noted below. In particular, the embodiment illustrated in FIG. 33 enjoys the thermal benefits previously described for the reduced thickness of conductive shelf 182, except with those thermal benefits being achieved via a reduced width of the conductive taps extending from the resistor pad (instead of via a reduced thickness as in FIGS. 8-13).

FIG. 33 illustrates heating element 812 including resistor pad 826 and conductive taps 840A, 840B. Each conductive tap 840A, 840B extends outwardly from opposite ends of the resistor pad 826 with conductive tap 840A extending into conductive element 879 and conductive tap 840B extending into via conductive element 878. Conductive element 879 extends from, and is in electrical connection with, a power bus of a printhead (e.g. power bus 109). In one embodiment, as illustrated in FIG. 33, conductive element 878 generally corresponds to via pad 119 (FIGS. 5-13) while conductive element 879 generally corresponds to extension portion 118 of power bus 109 (FIGS. 5-13).

In one aspect, resistor pad 826 has a width W7 while each conductive tap 840A, 840B has a width W6 that is substantially less than the width W7 of resistor pad 826. In one embodiment, the substantially smaller width W6 of conductive taps 840A, 840B is about one-half the width W7. In other embodiments, width W6 of conductive taps 840A, 840B is more than one-half or less than one-half than width W7 of resistor pad 826, provided that a volume of the conductive tap 840A, 840B is substantially reduced from an otherwise full width conductive tap 840A, 840B (i.e., having a width W7). In one embodiment, as illustrated in FIG. 33, conductive tap forms a relatively abrupt angle (e.g., 90 degrees) relative to the ends of resistor pad 826.

In one embodiment, a length (L5) of the portion of each conductive tap 840A, 840B defining the width W6 is based on the thermal diffusivity of the material of the conductive element. In one embodiment, each conductive tap is made of aluminum, and a length of the conductive tap is about 10 microns.

In one embodiment, heating element 812 is prepared according to a process in which both the respective conductive taps 840A, 840B and the resistor pad 826 are formed to have a second width (W7), after which a volume of each respective conductive tap 840A, 840B is substantially decreased. This volume reduction is performed via removing at least one portion of the respective conductive taps 840A, 840B (along their length L5) to reduce the second width (W7) of the respective conductive taps down to the first width (W6). In this embodiment, the "full width" conductive taps 840A, 840B prior to their reduction is represented by dashed lines 845.

In one embodiment, the respective conductive taps 840A, 840B are initially formed to have the first width (W6) and the resistor pad to have the second width (W7), wherein masking an area surrounding the resistor pad 826 enables initially depositing the conductive material of the respective conductive taps 840A, 840B in their final width, which is equal to first width (W6).

Other techniques consistent with the embodiments previously described in association with FIGS. 1-32 also may be used to define the generally narrow width W6 of conductive taps 840A, 840B (or 850A, 850B) extending from resistor pad 826.

Figure 34:
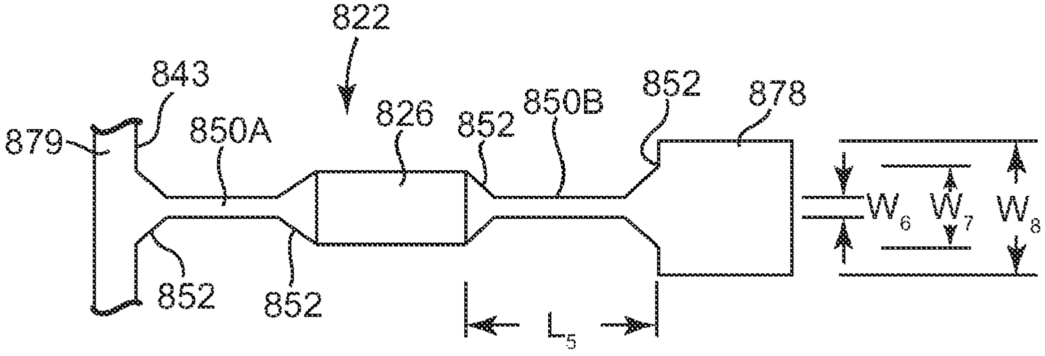
FIG. 34 is a top view of a resistor strip of a heating element of a printhead, according to one embodiment of the present disclosure.

FIG. 34 is a top plan view of a heating element 822, according to one embodiment of the present disclosure. In one embodiment, heating element 822 comprises substantially the same features and attributes as heating element 812, except including conductive taps 850A, 850B (instead of conductive taps 840A, 840B) having tapered end portions 852. As illustrated in FIG. 34, the tapered end portion 852 of each conductive tap 850A, 850B forms a generally obtuse angle relative to the ends of resistor pad 826. In another aspect, the tapered end portion 852 forms a generally obtuse angle relative to the end of conductive element 878 and relative to an edge 843 of conductive element 879.

Embodiments of the present disclosure increase longevity of a heating element of a fluid ejection device, such as a printhead assembly, by establishing low profile transitions at the sidewalls and end portions of a resistor portion of the heating elements. These low profile transitions, in turn, promote formation of generally smoother and stronger upper layers, such as the passivation and cavitation barrier layers, to better resist the corrosive action of some inks and fluids. In addition, a reduced topography of conductive elements surrounding a resistor pad provides increased longevity for a heating element by increasing the thermal efficiency of the heating element. The reduced topography effectively prevents or at least reduces heat transfer from the resistor pad to the conductive elements so that more of the heat generated by the resistor pad is applied to the ink or fluid within the fluid chamber instead of being lost laterally in the thin film layers surrounding the resistor pad.

While the above description refers to the inclusion of a low profile topography of a resistor portion of a heating region formed in an inkjet printhead assembly, as one embodiment of a fluid ejection assembly of a fluid ejection system, it is understood that this low profile resistor topography may be incorporated into other fluid ejection systems including non-printing applications or systems, such as medical devices and the like.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited by the claims and the equivalents thereof.

What is claimed is:

1. A method of making a printhead, the method comprising:

forming a resistor strip in a heating region of the printhead, including forming a resistive layer including a central resistor region interposed between two spaced apart conductive elements, wherein the resistive layer and a first conductive layer overlie a substrate in a side area of the heating region, the side area extending laterally outward from opposite side edges of the respective conductive elements and of the central resistor region of the resistive layer;

forming a bus region adjacent the heating region, the bus region including at least a second conductive layer;

removing at least the second conductive layer from a bus region of the printhead while protecting a first portion of the heating region, including preserving the resistive layer and the first conductive layer in at least a shoulder portion of the side area of the heating region immediately adjacent the opposite side edges of the central resistor region; and removing the resistive layer and the first conductive layer from at least the shoulder portion of the side area of the heating region to define a sidewall of the central resistor region.

2. The method of claim 1 wherein forming the resistor strip of the heating region comprises forming the resistive layer to extend underneath the respective conductive elements.

3. The method of claim 1 wherein forming the resistor strip of the heating region comprises forming the resistive layer to overlie the respective conductive elements.

4. The method of claim 1 wherein the substrate supports an insulation layer and wherein a top surface of the central resistor region is vertically spaced above a top surface of the insulation layer in the completed formation of the heating region by a distance no more than twice a thickness of the central resistor region.

5. The method of claim 1 wherein removing the second conductive layer comprises protecting substantially the entire heating region of the printhead during removal of the second conductive layer from the bus region.

6. The method of claim 5 wherein removing the resistive layer and the first conductive layer from at least the shoulder portion of the side area comprises removing the resistive layer and the first conductive layer from substantially the entire side area of the heating region.

7. The method of claim 6 wherein a depth of removal of the second conductive layer of the bus region is substantially greater than a depth of removal of the resistive layer and the first conductive layer of the shoulder portion of the side area of the heating region.

8. The method of claim 7 wherein the depth of removal of the second conductive layer of the bus region is at least about 4000 Angstroms and the depth of removal of the resistive layer and the first conductive layer in the shoulder portion is about 2000 Angstroms.

9. The method of claim 1 wherein preserving at least the shoulder portion, during removal of the second conductive layer from the bus region, comprises the shoulder portion comprising less than one-half a width of the side area to permit removal of the resistive layer and the first conductive layer outside the shoulder portion of the side area of the heating region simultaneous with the removal of the second conductive layer from the bus region.

10. The method of claim 9 wherein removing the resistive layer and the first conductive layer from at least the shoulder portion of the side area comprises removing the resistive layer and the first conductive layer from the shoulder portion of the side area of the heating region without removing the first conductive layer from other portions of the side area.

11. The method of claim 10 wherein the depth of removal of the resistive layer and the first conductive layer outside the shoulder portion of the side area of the heating region is substantially equal to the depth of removal of the second conductive layer of the bus region.

12. The method of claim 1 wherein the respective conductive elements have a thickness substantially greater than a thickness of the first conductive layer.

13. The method of claim 12 wherein the thickness of the respective conductive elements is about 5000 Angstroms and the thickness of the first conductive layer is about 1000 Angstroms.

* * * * *